United States Patent [19]
Ozaki et al.

[11] Patent Number: 5,627,968
[45] Date of Patent: May 6, 1997

[54] DATA TRANSFER APPARATUS WHICH ALLOWS DATA TO BE TRANSFERRED BETWEEN DATA DEVICES WITHOUT ACCESSING A SHARED MEMORY

[75] Inventors: Tohru Ozaki; Rikiya Okamoto; Junichi Sugiyama; Seiya Shimizu, all of Kawasaki, Japan

[73] Assignee: Fujitsu Limited, Kawasaki, Japan

[21] Appl. No.: 274,732

[22] Filed: Jul. 18, 1994

[30] Foreign Application Priority Data

Jul. 27, 1993 [JP] Japan ................... 5-185064
May 9, 1994 [JP] Japan ................... 6-095076

[51] Int. Cl.⁶ ................... G06F 13/362; G06F 13/36
[52] U.S. Cl. ................... 395/200.07; 395/250
[58] Field of Search ................... 395/250, 474, 395/477, 200.07; 370/85.2

[56] References Cited

U.S. PATENT DOCUMENTS

| | | | |
|---|---|---|---|
| 4,485,438 | 11/1984 | Myrmo et al. | 395/325 |
| 4,539,637 | 9/1985 | DeBruler | 395/650 |
| 4,564,900 | 1/1986 | Smitt | 395/200.07 |
| 4,591,977 | 5/1986 | Nissen et al. | 395/200 |
| 4,710,868 | 12/1987 | Cocke et al. | 395/325 |
| 4,843,542 | 6/1989 | Dashiell et al. | 395/425 |
| 5,050,072 | 9/1991 | Earnshaw et al. | 395/325 |
| 5,123,106 | 6/1992 | Otsuki et al. | 395/725 |
| 5,146,589 | 9/1992 | Peet et al. | 395/575 |
| 5,237,686 | 8/1993 | Asano et al. | 395/650 |
| 5,274,787 | 12/1993 | Hirano et al. | 395/425 |
| 5,327,540 | 7/1994 | Heil et al. | 395/325 |
| 5,440,698 | 8/1995 | Sindhu et al. | 395/200.08 |

FOREIGN PATENT DOCUMENTS 2-211571  8/1990  Japan .

OTHER PUBLICATIONS

Murakami et al.; A DSP Architectural Design for Low Bit–Rate motion Video Codec; Oct. 10, 1989; IEEE Transations On Circuits and Systems; vol. 36, No. 10, pp. 1267–1274.

*Primary Examiner*—Richard L. Ellis
*Assistant Examiner*—Kenneth R. Coulter
*Attorney, Agent, or Firm*—Staas & Halsey

[57] ABSTRACT

A data transfer apparatus which includes data devices which access a common, shared memory. Each data device is connected to a corresponding data buffer. A memory bus is connected to each of the data buffers and to the shared memory to allow data to be transferred between the data buffers and between the data devices and the shared memory via the data buffers. Data is transferrable between a transferring data device to a receiving data device by transferring data from the transferring data device to the data buffer corresponding to the transferring data device, from the data buffer corresponding to the transferring data device to the memory bus, from the memory bus to the data buffer corresponding to the receiving data device, and then from the data buffer corresponding to the receiving data device to the receiving data device. A data transfer controller controls the data buffers and the shared memory so that the shared memory does not transfer data onto the memory data bus when, during the transfer of data between the transferring data device and the receiving data device, data is being transferred between the data buffer corresponding to the transferring data device and the data buffer corresponding to the receiving data device via the memory bus.

22 Claims, 36 Drawing Sheets

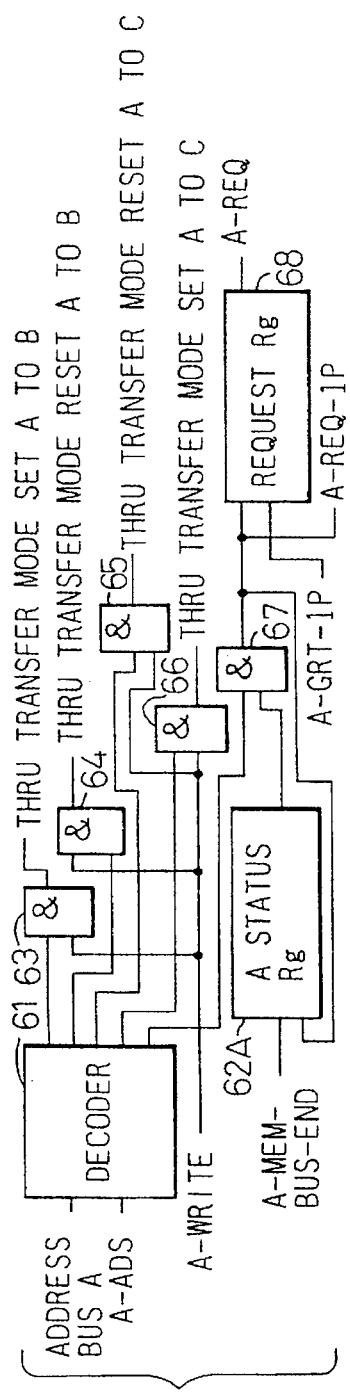
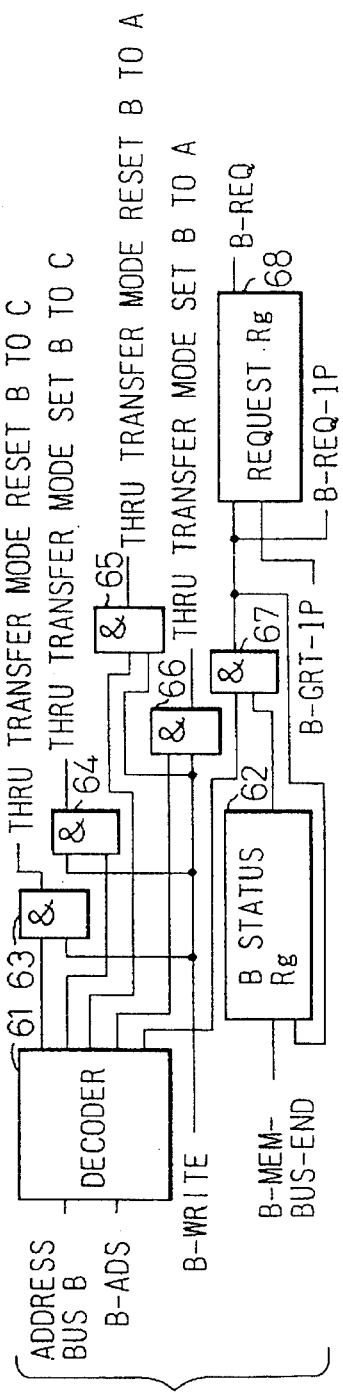
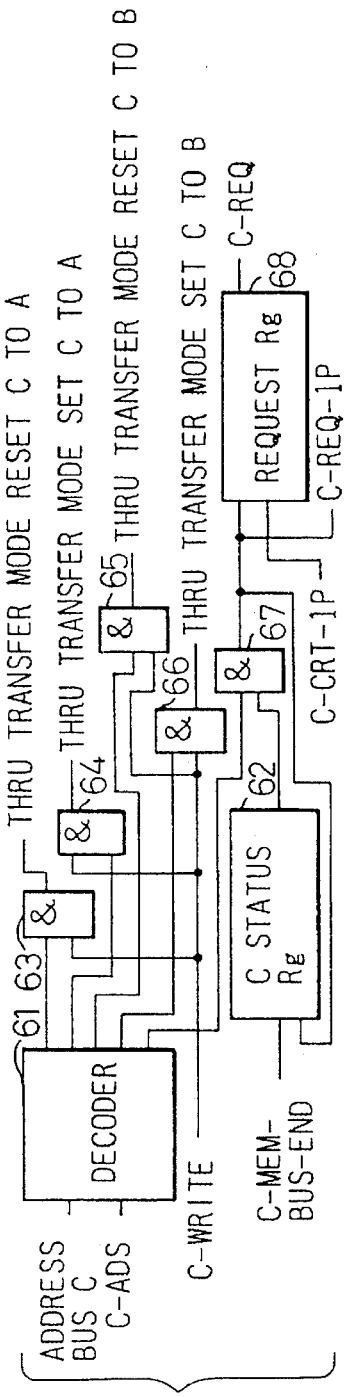
Fig.6(A)
Fig.6(B)
Fig.6(C)

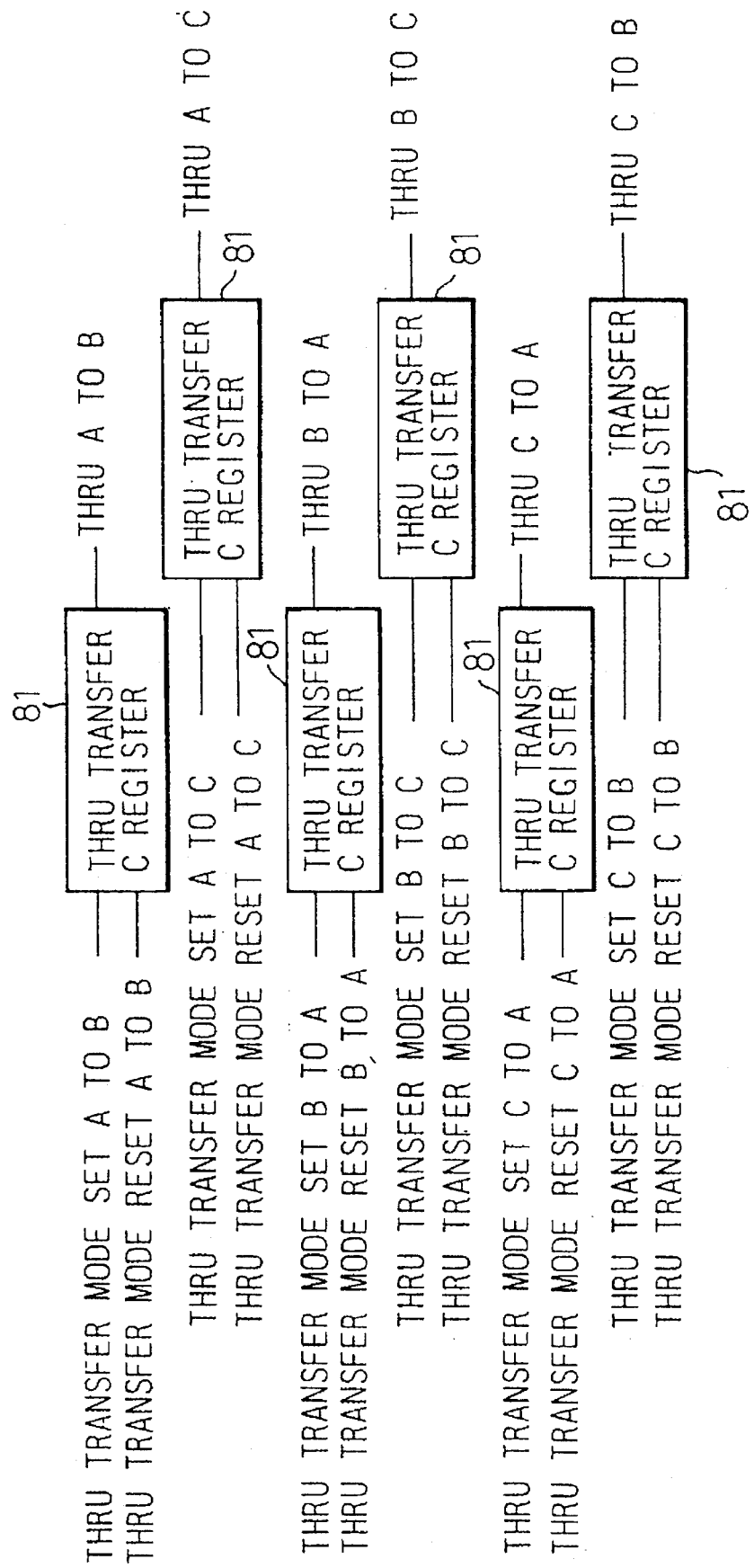

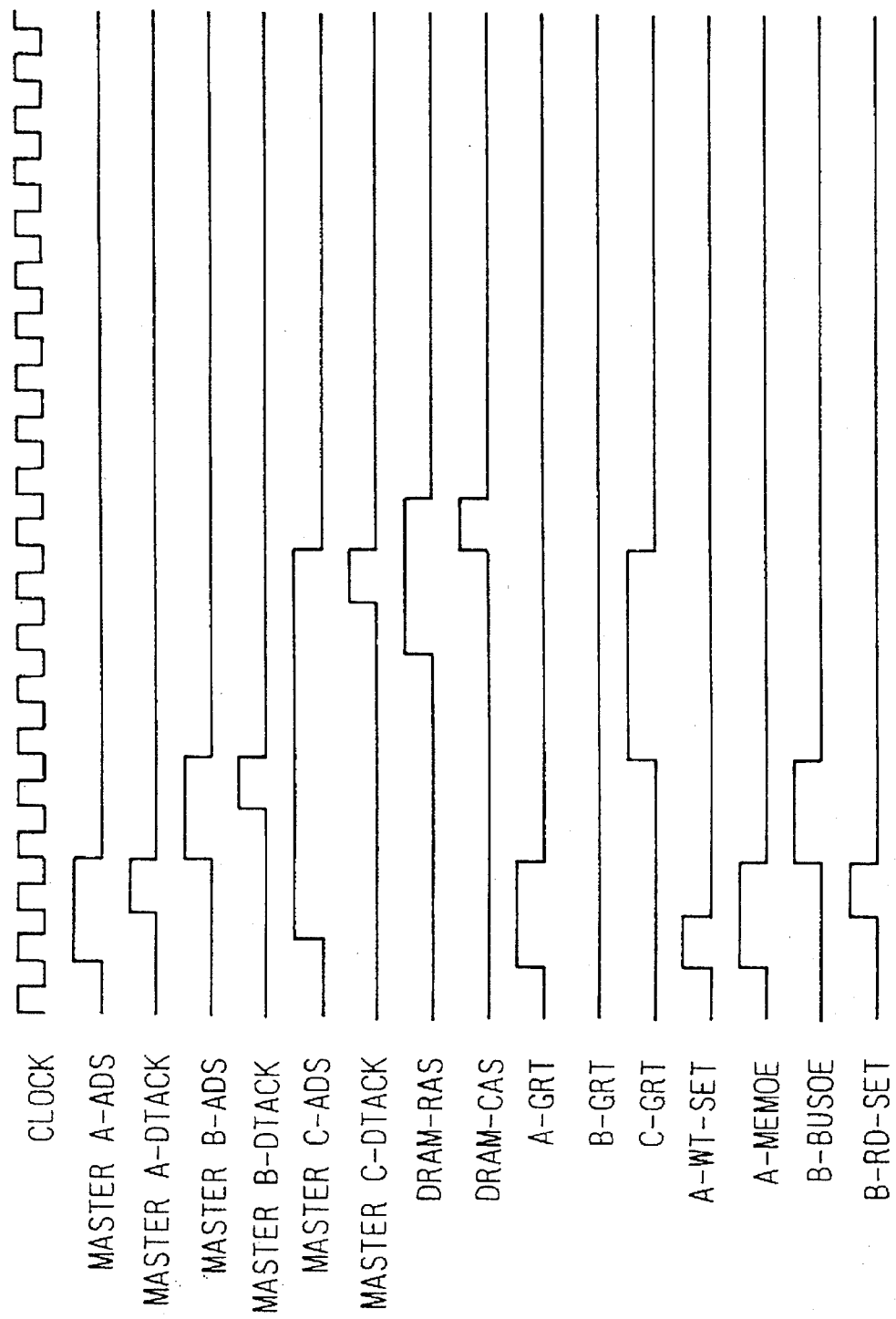

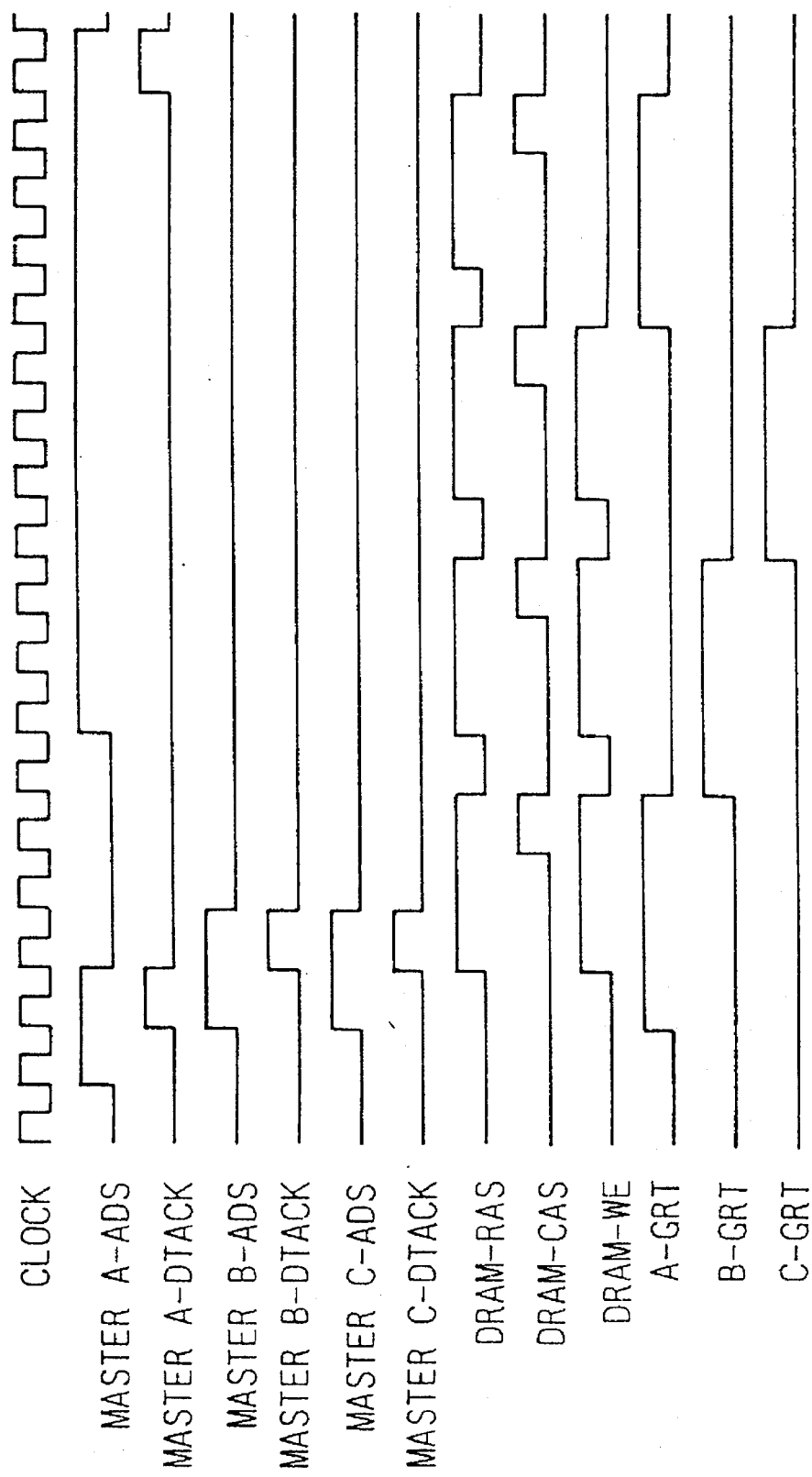

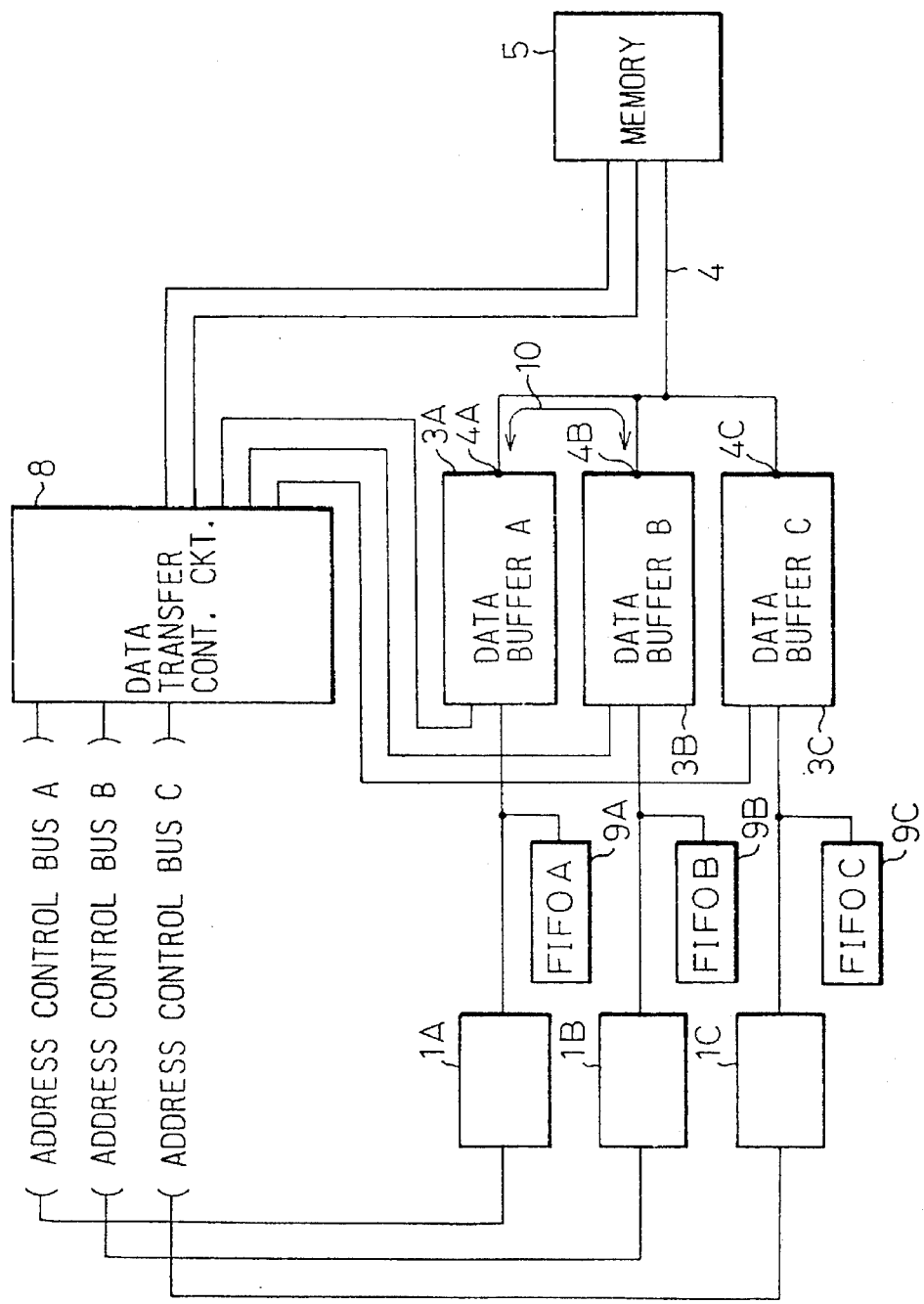

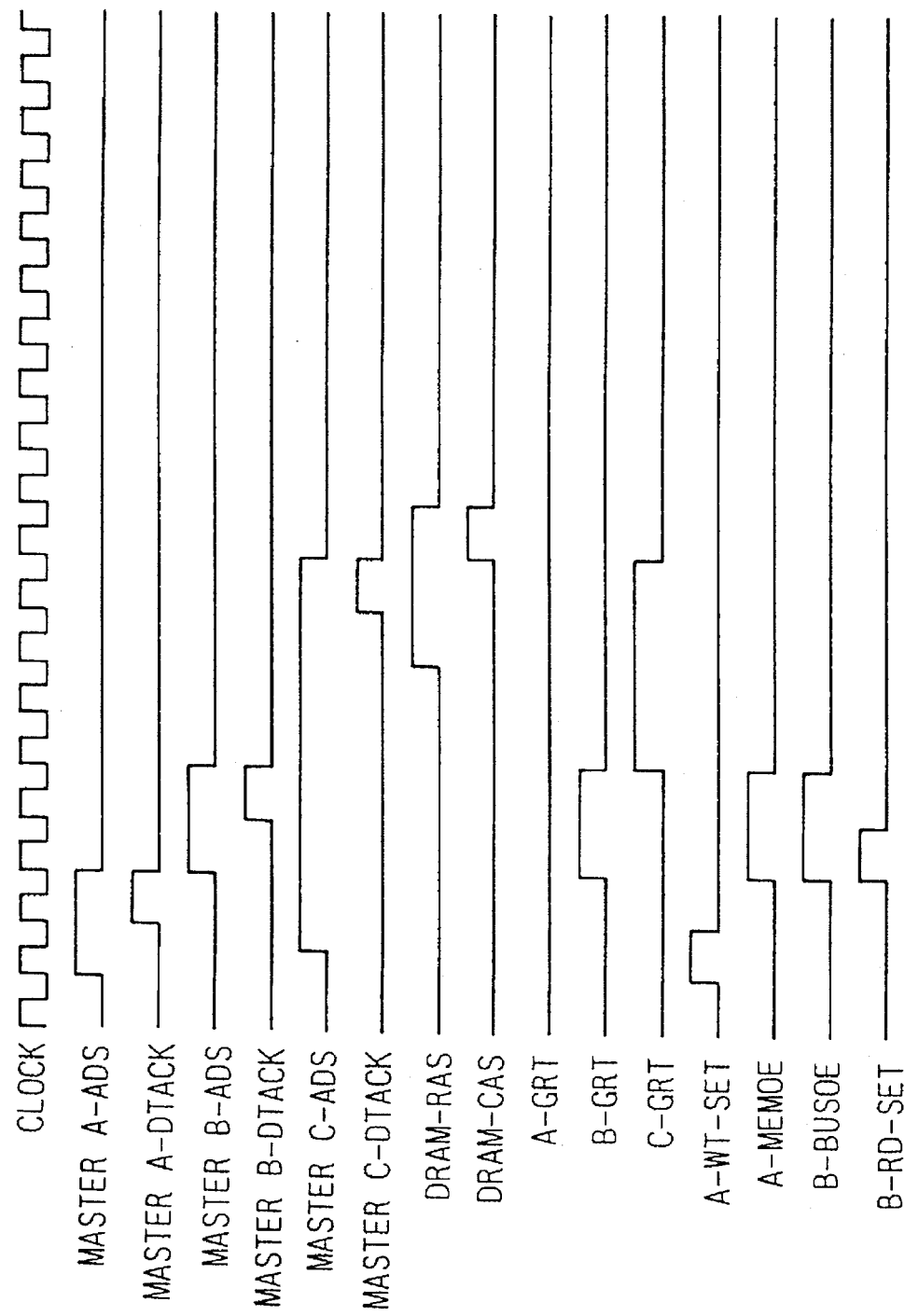

DATA TRANSFER APPARATUS WHICH ALLOWS DATA TO BE TRANSFERRED BETWEEN DATA DEVICES WITHOUT ACCESSING A SHARED MEMORY

BACKGROUND OF THE INVENTION

1. Field of the Invention

The present invention relates to a data transfer system and to a data transfer apparatus. More specifically, the invention relates to a data transfer system used for a computer and, particularly, for a parallel computer, a computer graphic (CG) accelerator or an image processing accelerator, and to a data transfer apparatus used therefor.

2. Description of the Related Art

So far, many operation methods have been developed and put into practical use for moving large amounts of data at high speeds in computers. In computers, computer graphics and image processing systems require the transfer of a predetermined amount of data at high speeds among a plurality of apparatuses (masters) by using a parallel processing system. For this purpose, an operation processing circuit must be developed.

FIG. 20 is a block diagram illustrating the constitution of a traditional data transfer apparatus that is used for transferring data at high speeds in high-speed processing.

That is, in the conventional data transfer apparatus shown in FIG. 20, a plurality of masters 1A, 1B and 1C are connected to corresponding data-holding means (data buffer means) 3A, 3B and 3C via data buses 2A, 2B and 2C, and outputs 4A, 4B and 4C of the data buffer means 3A, 3B and 3C are connected to a common I/O terminal 6 of a shared memory 5 via a memory data bus 4.

Here, the master generally stands for an operation processing constitution which at least includes a host computer, has a function for operating on the data, has a function for inputting data, stores the results of an operation processed by the operation function, and further has an output function (the word master is hereinafter used to designate the same object).

In the conventional data transfer apparatus of this system, predetermined data are transferred between a memory (shared memory) and a plurality (n) of masters. The above system has been so constituted that the predetermined data are transferred not only between a given master 1N and the shared memory 5 but also between one master and another master in the plurality of the masters 1A to 1N.

In the above conventional data transfer apparatus, when it is desired to transfer predetermined data from a master 1A to another master such as 1B, the predetermined data output from the master 1A is once written and stored in a predetermined address in the shared memory 5 that is connected to the memory data bus 4 via the data buffer means 3A and, then, the master 1B, to which the data should be transferred, makes an access to the shared memory 5 to read the address thereof.

In this constitution, the data can be transferred most quickly when no access is made from other masters while the master 1A is writing the data to be transferred into the shared memory 5 and the master 1B is reading the data from the shared memory. The transfer of data, however, needs a predetermined cyclic period i.

In the above constitution, however, when an access is made from other masters, contention of data occurs on the memory data bus and a considerable number of cycles are needed before the predetermined data is transferred, and the transfer speed of the data to be operated is reduced correspondingly.

FIG. 21 is a timing chart for transferring the data by the conventional data transfer apparatus shown in FIG. 20, wherein FIG. 21(A) explains the case where the data is to be transferred from the master 1A to the master 1B.

FIG. 21(A) is a timing chart explaining the case where the master 1A makes access to the shared memory 5 to write data therein in order to transfer the predetermined data from the master 1A to the master 1B and where no access is being made to the shared memory from a master 1N other than the master 1B before the master 1B outputs an access signal for requesting the reading, and FIG. 21(B) is a timing chart explaining the case where the master 1A makes access to the shared memory 5 to write data therein in order to transfer the predetermined data from the master 1A to the master 1B and where an access is made to the shared memory from a master 1N other than the master 1B before the master 1B outputs an access signal for requesting the reading.

That is, FIG. 21(A) is a timing chart of the case where the data are transferred from the master 1A to the master 1B, wherein an address data strobe signal A-ADS is, first, output in response to a clock signal t2, an address data is output to write the data of the master A onto a predetermined position of the shared memory 5, an A-DTACK signal is turned on to indicate that the data is ready to be written into the shared memory 5 and, then, the master A is allowed to execute another operational processing.

A write enable signal (DRAM-WE) to the shared memory 5 is turned on in response to a clock signal t4 and, as a result, an address DRAM-RAS in the DRAM of the shared memory 5 is turned on, so that the data from the master 1A is written into the memory.

On the other hand, the master 1B that receives the predetermined data from the master 1A outputs an address data strobe signal B-ADS in response to a clock signal t3, outputs an address data to write the data into a predetermined position of the shared memory 5, and wherein a B-DTACK signal is turned on in response to a clock signal t9 to indicate that the data is ready to be written into the shared memory 5. The master 1B is then allowed to execute another operation processing.

For this purpose, a write enable signal is output at a suitable timing or, in this example, at around a clock signal t8 to read the data.

FIG. 21(B) illustrates an example where the data to be transferred is output from the master 1A to the shared memory 5, and address signals C-ADS and D-ADS related to other data are output from other masters 1C and 1D before the master 1B outputs the address signal B-ADS for designating the address of the shared memory 5 to read the data that is to be transferred. The address signal C-ADS related to other data is output from the master 1C in response to a clock signal t5 and, hence, the data of the master 1C is written into the address DRAM-RAS in the DRAM of the shared memory 5.

Similarly, data corresponding to D-ADS from the master 1D is written into the DRAM of the shared memory.

After the above interrupt processing is finished, the B-DTACK signal is produced for the first time in response to a clock signal t18.

That is, in this example, an interrupt generated by another master causes a great delay before the data from the master 1A is read by the master 1B.

In the conventional data transfer apparatus, therefore, each of the plurality of masters had to make access to the single shared memory. Once contention of data occurred in the memory data bus, therefore, a considerable period of time was needed before the transfer of data was finished. Therefore, it has became necessary to develop a new data transfer apparatus.

According to a method of solving the above-mentioned problem as indicated by a dotted line in FIG. 20, provision is made of data buffer means 7-1 and 7-2 directly connecting the data buses of the two different masters in order to realize the transfer of data between the two masters without using the shared memory 5.

According to the above constitution, the data are transferred without passing through the shared memory 5 unlike the aforementioned prior art, and the data can be transferred very quickly. However, data buffer means are necessary for transferring the data among the masters in addition to data buffer means between the masters and the memory, resulting in a complex circuit constitution and lengthened wirings. It is therefore difficult to realize the apparatus in a small size without increasing the cost.

SUMMARY OF THE INVENTION

The object of the present invention is to provide a data transfer system and a data transfer apparatus that allows data to be easily transferred among a plurality of masters at high speed without using a complex circuit constitution by removing the defects inherent in the prior art.

In order to achieve the above object, the present invention basically employs the technical constitutions mentioned below.

That is, the invention is concerned with a data transfer system in which data-holding means are provided between a plurality of devices and at least one shared memory means, the data-holding means corresponding to said devices, said devices and said data-holding means being connected together, and said data-holding means and said shared memory means being connected to a memory data bus, wherein the data of one device among said plurality of devices is directly transferred to a data-holding means connected to another device from a data-holding means connected to said one device via said memory data bus. The invention is further concerned with a data transfer apparatus comprising a plurality of devices, at least one shared memory means, a plurality of data-holding means corresponding to said plurality of devices, data buses provided between said devices and said data-holding means corresponding to said devices, a memory data bus provided between said data-holding means and said shared memory means, and a data transfer control means which is connected to said data-holding means and to said shared memory means.

According to the data transfer system and the data transfer apparatus of the present invention, the data are basically transferred between a plurality (n) of devices called masters and one memory, i.e., a shared memory, and among the plurality of devices (masters) without passing through the shared memory means, the data transfer system and the data transfer apparatus comprising data-holding means constituted by data-buffer means of a number of n for storing the data from the devices (masters) and the data from the memory data bus, and a controller that receives addresses and control signals from the devices (masters) of the number of n and outputs signals for controlling the data-holding means that are the data buffer means as well as addresses and control signals for the shared memory. Concretely speaking, the output terminals of the data buffer means which are the data-holding means are connected to one another on the side of the memory data bus, the data-holding means being connected to the devices among which the data are to be transferred, so that the predetermined data can be transferred from one data-holding means to another data-holding means without passing through the shared memory means.

By employing the above constitution, the predetermined data can be transferred from any device (master) to another device (master) without causing the transfer of data to be delayed between the devices when an access is made from other devices (masters).

BRIEF DESCRIPTION OF THE DRAWINGS

FIGS. 6(A) to 6(C) are block diagrams for illustrating the concrete constitution of a decoder/requester used in the present invention;

FIG. 7 is a block diagram for illustrating the operation of a through transfer mode register used in the present invention;

FIG. 13 is a timing chart for illustrating a procedure of a data transfer system according to the present invention;

FIG. 14 is a timing chart for illustrating another procedure of the data transfer system according to the present invention;

FIG. 15 is a block diagram for illustrating the constitution of the data transfer apparatus according to a second embodiment of the present invention;

FIG. 19 is a timing chart for illustrating another procedure of the data transfer system according to a third embodiment of the present invention;

DETAILED DESCRIPTION OF THE PREFERRED EMBODIMENTS

Embodiments of the data transfer system and the data transfer apparatus according to the present invention will now be described in detail with reference to the drawings.

Figure 1:
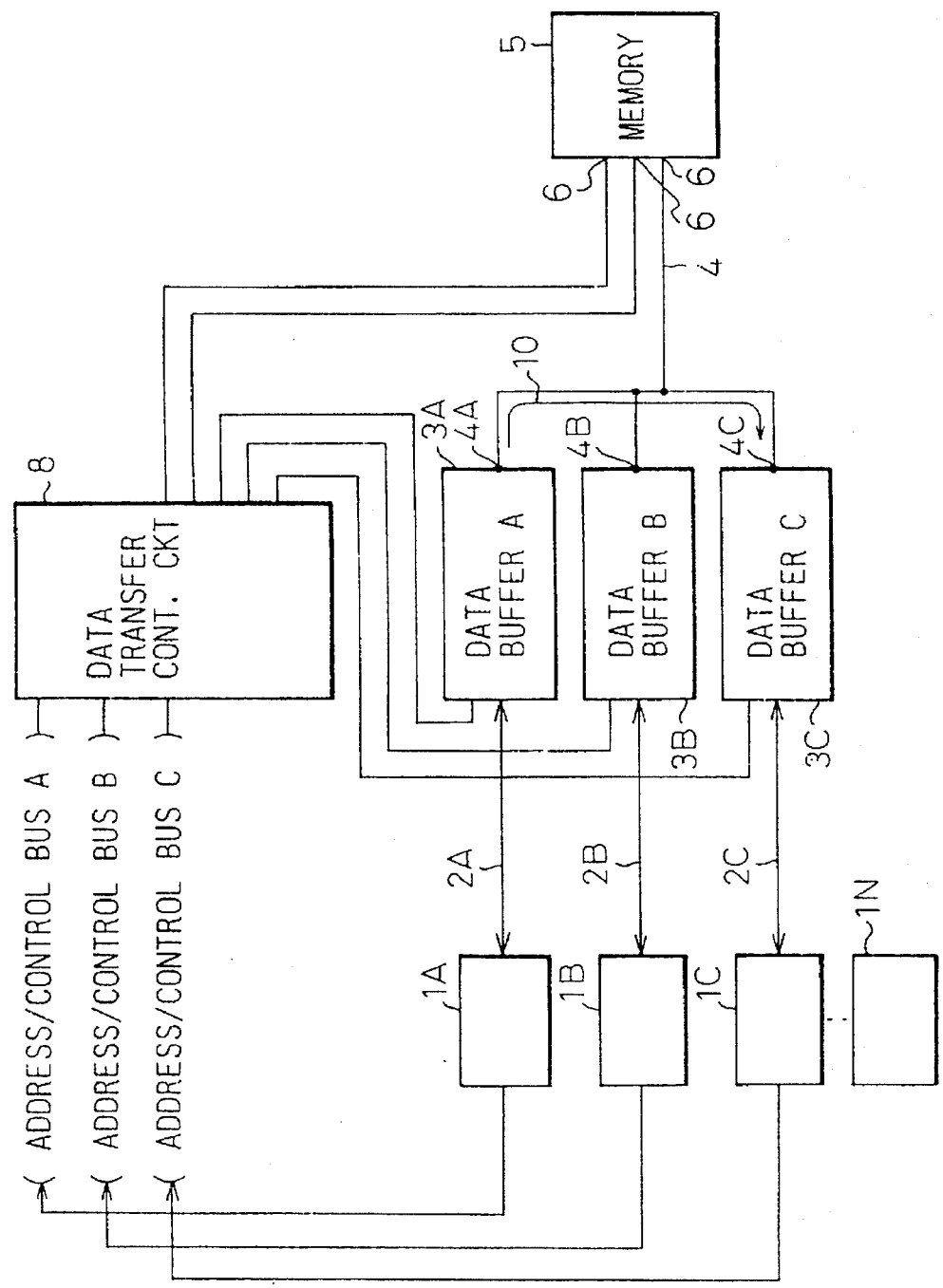
FIG. 1 is a block diagram for illustrating the constitution of a data transfer apparatus according to the present invention.

FIG. 1 is a block diagram illustrating the concrete constitution of a data transfer apparatus adapted to executing the data transfer system of the present invention, wherein the data transfer apparatus comprises a plurality of masters 1A, 1B, 1C, at least one memory means 5, a plurality of data buffer means 3A, 3B, 3C corresponding to the plurality of masters 1A, 1B, 1C, data buses 2A, 2B, 2C provided between the masters and the data buffer means corresponding to the masters, a memory data bus 4 provided between the data buffer means and the memory means, and a data transfer control means 8 that is connected to the data buffer means 3A, 3B, 3C and to the memory means 5.

In this data transfer apparatus, the data of one master among the plurality of masters is allowed to be transmitted from a data buffer means connected to the above master to a data buffer means connected to another master to which the data needs be directly transferred via the memory data bus.

That is, in the data transfer system according to the present invention as described above, the memory means 5 is so controlled as will not make an access to the memory data bus 4 while the data of, for example, the master 1A is being directly transferred from a data buffer means 3A that corresponds to the above master to, for example, a data buffer means 3B that corresponds to the master 1B via the memory data bus 4. To do this, the plurality of data buffer means 3 corresponding to the masters and the memory means 5 are controlled by the data transfer control means 8.

According to the present invention, furthermore, the data transfer control means 8 is controlled by at least address data of the masters 1A, 1B and 1C and control bus data of the masters.

The data transfer means 8 operates even during an ordinary memory access period. Even during the transfer of data without using the memory, the data lines 4A, 4B, 4C and the memory means 5 are electrically connected together. In this case, the data output from the memory has an "L" level and the control signal simply does not work for the memory.

Concretely described below are the circuit constitution and functions of the data transfer apparatus that realizes the above-mentioned data transfer system.

As shown in FIG. 1, the data buffers 3 (A, B, C) correspond to the data buses 2 that are connected to the plurality of masters 1, and the data lines 4A to 4C of the data buffers are connected to a data input/output terminal 6 of the memory 5. The data buses 2 and the memory buses 4 are usually bidirectional so that the size will not become large. Therefore, the data buffers 3 must be bidirectionally controlled either on the side of the data buses 2 and on the side of the memory data bus 4. Moreover, when there are a plurality of hosts 1 for the memory 5, it is not allowed for a given host to occupy the memory. To increase the operation speed of the system, therefore, it becomes necessary to provide a register that is capable of exhibiting buffering action in synchronism with the clock signals in both directions (write/read). It is further desired that the data transfer control circuit 8 inputs addresses and control signals from the masters 1A, 1B, 1C, judges whether the data are being transferred between the masters 1 and the memory 5 or between the hosts, arbitrates the requests from the masters, and makes accesses in the order of decreasing priority by using the memory data bus 4. In this case, as will be described later, the data transfer control circuit 8 generates bidirectional control signals for the data buffers 3 and a signal such as a storage enable signal for the register.

According to the present invention, there is no particular limitation on the constitution of the data buffer means 3, and any widely known data buffer means can be used. Preferably, use is made of a data buffer means having a circuit constitution that is shown in a block diagram of FIG. 2.

Figure 2:
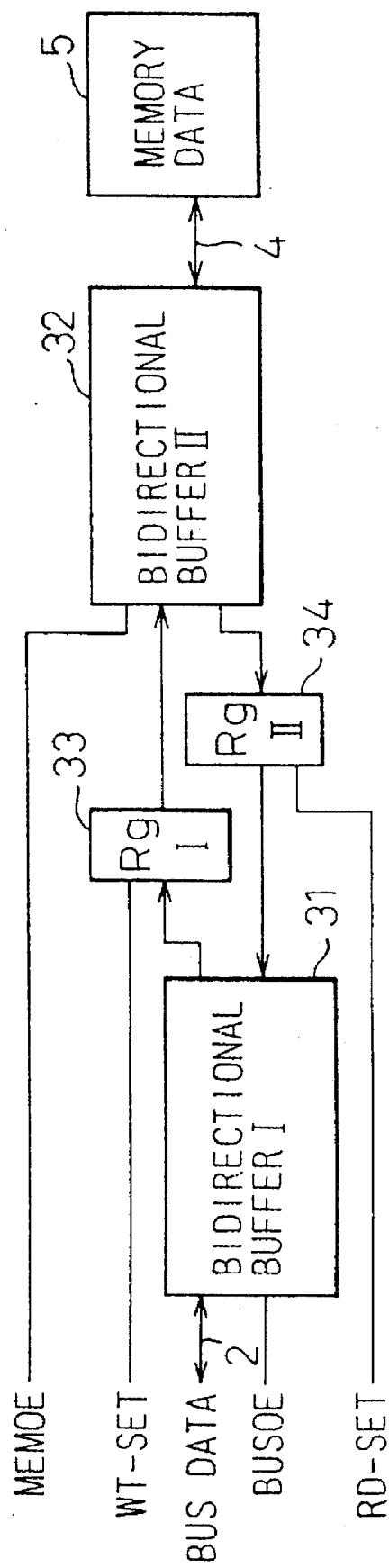
FIG. 2 is a block diagram for illustrating the concrete constitution of a data buffer means used in the present invention.

FIG. 2 illustrates an example of the data buffer means 3 constituted by a first bidirectional data buffer circuit 31 which is connected to the data bus 2 and of which the output can be controlled, a second bidirectional data buffer circuit 32 which is connected to the memory data bus 4 and of which the output can be controlled, at least one stage of write register 33 which receives the output from the first bidirectional data buffer circuit 31 and sends an output to the second bidirectional data buffer circuit 32, and at least one stage of read register 34 which receives the output from the second bidirectional data buffer circuit 32 and sends an output to the first bidirectional data buffer circuit 31.

According to the present invention, the data transfer control means 8 of any constitution can be used provided it has a function of forming a data transfer path 10 which, when the data of, for example, a master 1A among the plurality of masters is to be transferred to another master 1C, directly connects the output terminal 4A of the data buffer means 3A connected to the master 1A to the output terminal 4C of the data buffer means 3C connected to the master 1C to which the data needs be directly transferred passing through part of the memory data bus.

Figure 3:
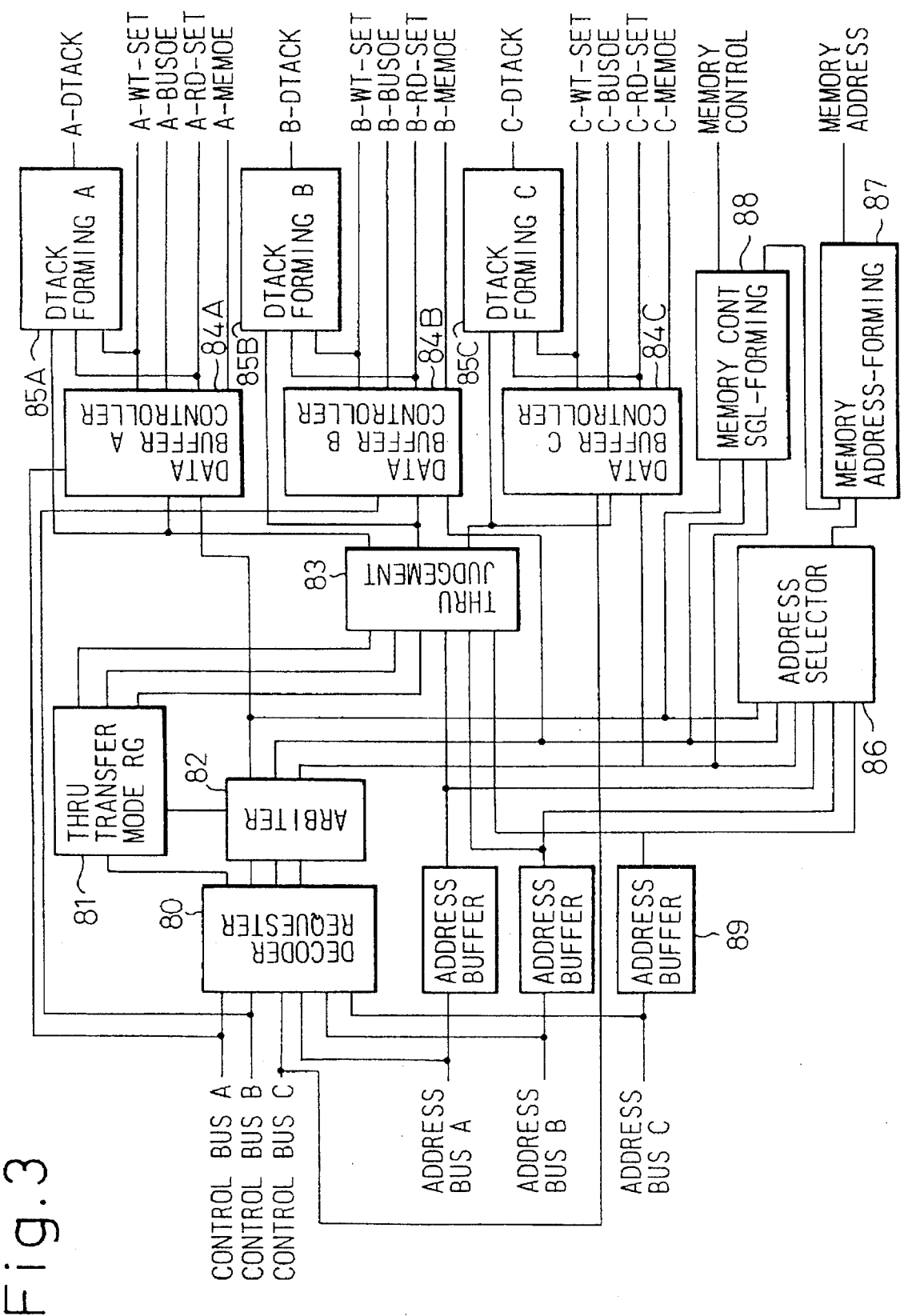
FIG. 3 is a block diagram for illustrating the concrete constitution of a data transfer control means used in the present invention.

FIG. 3 is a block diagram illustrating the concrete constitution of the data transfer control means 8 used in the present invention. Basically, the data transfer control means 8 is equipped with a function for so controlling the memory means 5 that the memory means 5 does not take part in the data transfer path 10 when the data transfer path 10 is formed from, for example, the output terminal 4A of the data buffer means 3 to the output terminal 4C of the data buffer means 3. Concretely speaking, the data transfer control means 8 is controlled by at least address data of the masters 1 and control bus data of the masters 1. The data transfer control means 8 is constituted by a through transfer mode register 81 for determining the transfer path 10 for a predetermined data in response to the data from the masters 1, an arbiter means 82 which receives access request signals from the plurality of the masters 1 and gives the right for using the memory data bus 4 to an access request signal from one master out of the plurality of the masters 1 in accordance with a predetermined priority order, a through judging means 83 which receives the output from the through transfer mode register 81, the output from the arbiter means 82 and the address and control signal, stores the address at the time of writing from the master during the through access period, and judges whether the address at the time of writing is the same as the address at the time of reading, and data buffer controllers 84A to 84C which receive the output from the through judging means 83, the control signal from the master and the output from the arbiter means 82, and outputs the output control signals for the first and second bidirectional data buffer circuits 31, 32 and outputs the storage control signals for the write and read registers in the data buffer means 3.

Described below is the operation of the data buffer means 3 of the present invention. In the following description, it is presumed that the address and data become effective when the address data strobe signal (ADS) is asserted. The data buffer 3 comprises the first bidirectional buffer 31 on the side of the data bus, the second bidirectional buffer 32 on the side of the memory bus, the writing resister 33 (RgI) and the reading register 34 (RgII). When BUSOE is asserted, the first bidirectional buffer 31 produces an output of a high level in response to the Bus data, and outputs the value of the register 34 (RgII). In other cases, the first bidirectional buffer 31 receives the data from the Bus data. At the same time, the second bidirectional buffer 32, when MEMOE is asserted, produces an output of a low level in response to the memory data 5 and outputs the value of the register 33 (RgI). In other cases, the second bidirectional buffer 32 receives the data from the memory data 5. When WT-SET is asserted, the register 33 (RgI) stores the output of the first bidirectional buffer 31. When RD-SET is asserted, similarly, the register 34 (RgII) stores the output of the second bidirectional buffer 32. In the present invention, the write register and the read register are each provided in one stage, but, however, they may be provided in a plurality of stages to improve the throughput of the system.

Figure 4A:
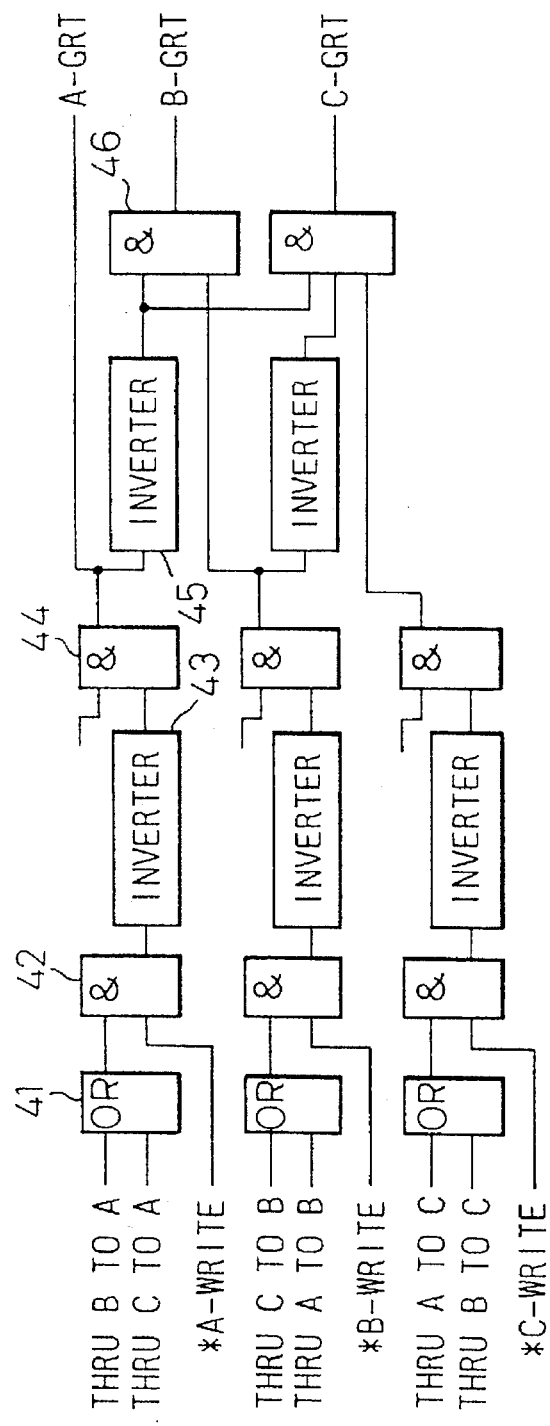
FIG. 4A is a block diagram for illustrating the concrete constitution of an arbiter means used in a first embodiment of the present invention.

The arbiter means 82 used in the data transfer control means 8 of the present invention has the circuit constitution as shown in FIG. 4A.

The arbiter means 82 has a function for arbitrating the requests of reading the data from the remory regions of other masters.

That is, the arbiter means 82 has the function for arbitrating the requests of writing the data into the memory regions of other masters, and produces a through signal that is output from the through transfer mode register 81, i.e., produces a signal indicating to which master the data from the master 1A be transferred without passing through the memory. When the data is to be transferred to the master 1B from the master 1A, the signal is expressed as through A to B, and when the data is to be transferred to the master 1C from the master 1A, the signal is expressed as through A to C.

That is, the arbiter means 82 according to the present invention is constituted by OR gate circuits 41 which receive the through signals, AND gates 42 which receive the outputs of the OR gate circuits 41 and write signals (A-WRITE, B-WRITE, C-WRITE) from the masters, AND gates 44 which receive access request signals (A-REQ, B-REQ, C-REQ) from the masters and the outputs of the inverters 43 that receive the outputs of the AND gates 42, and a priority order determining circuit 47 constituted by inverters 45 and AND gate circuits 46 to determine the priority order from the outputs of the AND gate circuits 44 and to output the rights (A-GRT, B-GRT, C-GRT) for using the memory data bus.

In the arbiter means of FIG. 4A, GRT is not asserted at the time of reading the data in the through access mode (*A-WRITE=HIGH in the case of A and A-WRITE=HIGH in the case of writing) since there is no need to occupy the memory data bus.

When a plurality of REQs are asserted, resulting in the occurrence of contention, any one of A-GRT, B-GRT OR C-GRT is asserted according to the priority order of A-REQ>B-REQ>C-REQ. During the reading in the through access mode, however, GRT is not asserted since the memory data bus is not used.

The above-mentioned through transfer mode register 81 and the arbiter means 82 are controlled by the decoder/requester 80 which receives address signals such as ADS from the masters as well as control signals of the masters, and determines the transfer mode and further determines between which masters the right (A-GRT, B-GRT, C-GRT) for using the memory data bus be given.

FIGS. 6(A) to 6(C) show the circuit constitutions of the decoder/requester 80.

When the ADS is asserted by an address for setting/ resetting the through transfer mode register 81 and when the write signal WRITE is asserted, the decoder/requester 80 sets or resets the through transfer mode. When the ADS is asserted by other addresses, access is requested to the memory region, and a request signal (REQ-1P) is asserted in the first cycle only when the status register is empty.

As shown in FIGS. 6(A) to 6(C), the decoder/requester 80 receives an address data bus signal for each of the masters, an address data strobe signal ADS, a write signal WRITE and an end signal (MEM-BUS-END is asserted) which indicates that the signals for making access are all finished, and is constituted by a decoder 61, a status register 62, AND gate circuits 63 to 67, and a request register 68.

For the master 1A, for example, the decoder 61A receives an A-address signal and an A-ADS signal, and sends an output to input terminals on one side of the AND gate circuits 63 to 67.

The write signal A-WRITE, on the other hand, is input to the input terminals on the other side of the AND gate circuits 63 to 67.

The memory data bus end signal (A-MEM-BUS-END) is input to the status register 62A together with the output of the AND gate circuit 67, and the output thereof is input to the input terminal of the AND gate circuit 67.

As a result as shown in FIG. 6, the AND gate 63 outputs a through transfer mode reset signal A to B, and the AND gate circuit 64 outputs a through transfer mode set signal A to B.

Moreover, the AND gate circuit 65 outputs a through transfer mode reset signal A to C, and the AND gate circuit 66 outputs a through transfer mode set signal A to C.

The output of the AND gate circuit 67 is input to the request register 68 together with a cycle signal of a right-to-use signal A-GRT from the arbiter means 82, and an access request signal A-REQ is output from the request register 68.

In this embodiment, when the access request signal A-REQ of the master 1A is asserted for a period of one cycle (1P), the request register 68 asserts the access request signal (REQ) and negates the request after the request is received (i.e., when A-GRT-1P is asserted).

FIG. 7 is a diagram which schematically illustrates the operation of the through transfer mode register 81 used in the present invention.

The through transfer mode register 81 according to the present invention receives a through transfer mode set/reset signal out of the outputs of the decoder/requester 80, and designates a data transfer path between the masters to which the data is to be transferred in response to the input signal.

That is, as described above, the through transfer mode register 81 asserts a through signal when a through transfer mode set signal is asserted, and negates the through signal when a through transfer mode reset signal is asserted.

Six kinds of through transfer mode registers 81 are provided in this embodiment, i.e., A to B, B to C, C to A, B to A, B to C, and A to C.

Figure 8A:
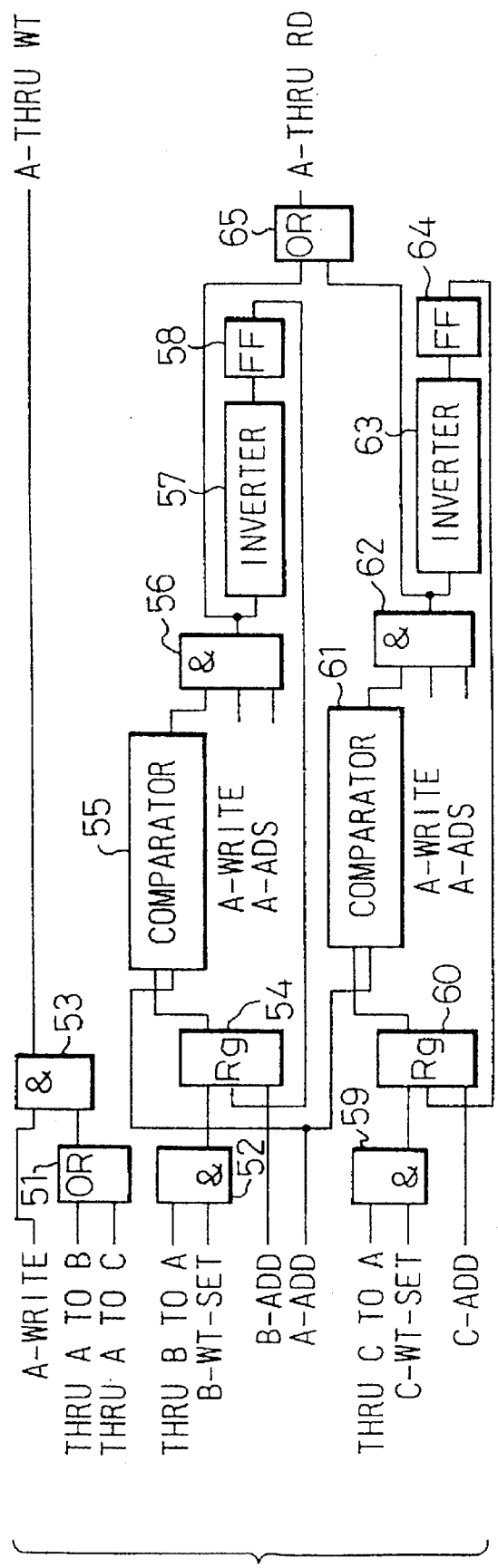
FIGS. 8(A) to 8(C) are block diagrams for illustrating the concrete constitution of a through judging means used in the present invention.
Figure 8B:
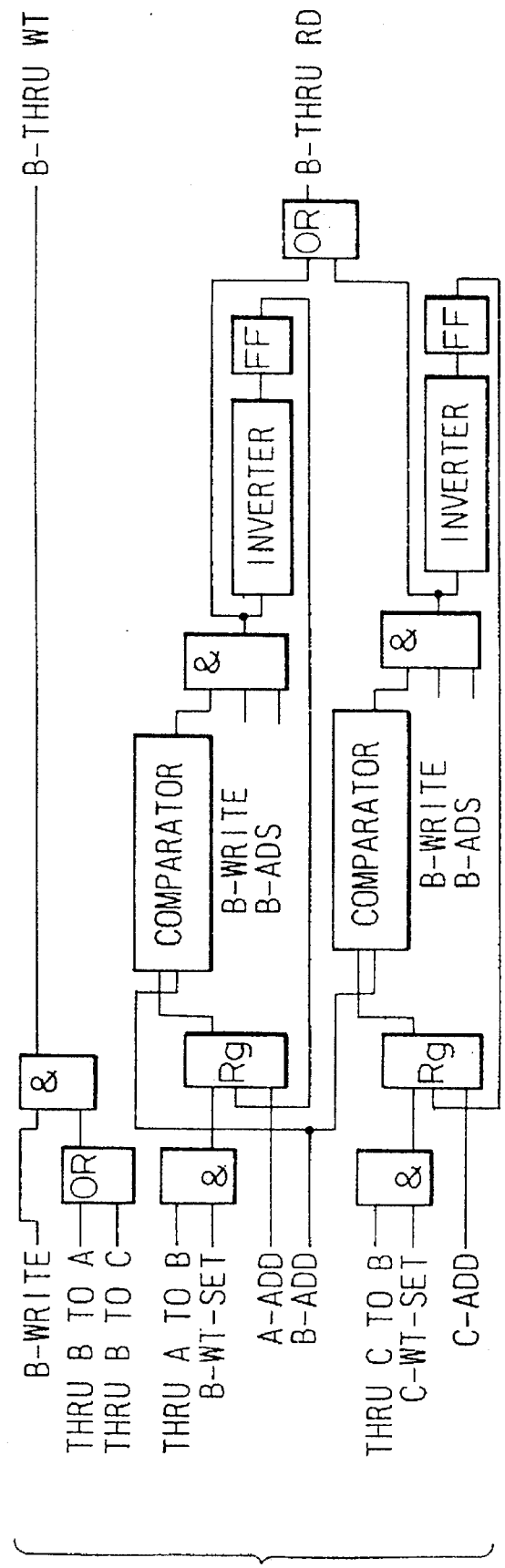
Figure 8C:
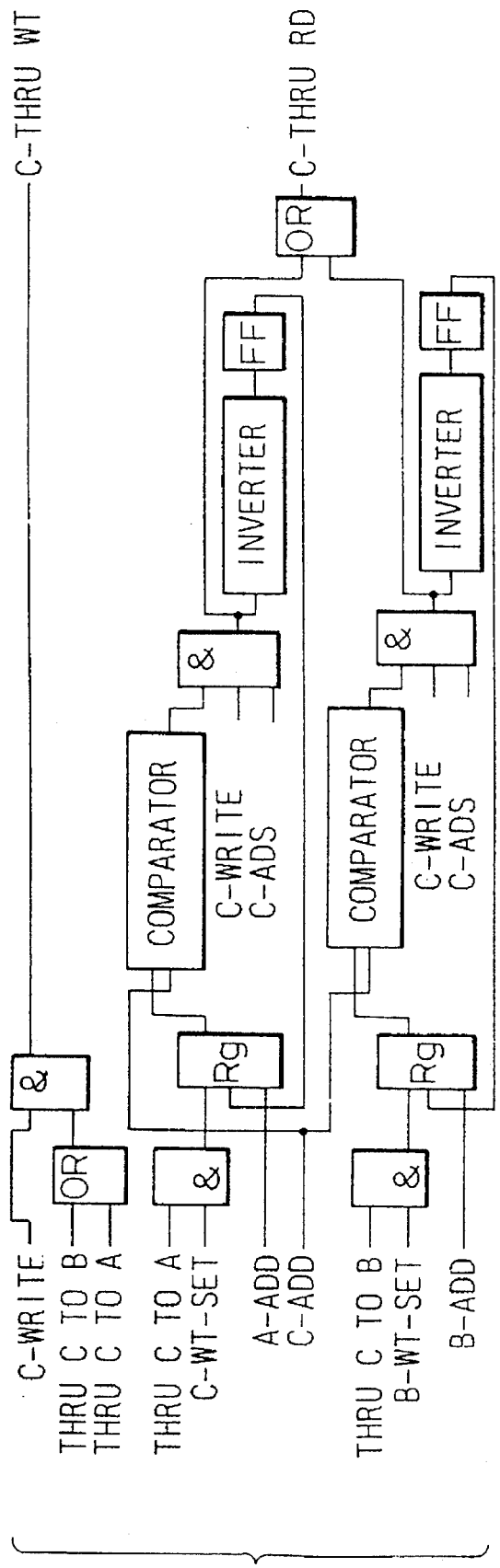

Constitution and function of the through judging means 83 used in the data transfer control means 8 of the present invention will now be described with reference to FIGS. 8(A) to 8(C).

As shown in a block diagram of FIG. 8, the through judging means 83 of the present invention constitutes a control circuit corresponding to the plurality of the masters 1A, 1B and 1C. Here, an internal circuit corresponding, for example, to the master 1A is constituted by an OR gate circuit 51 which receives through signals A to B and A to C, an AND gate circuit 53 which receives an output of the OR gate circuit 51 and a write signal (A-WRITE) of the master 1A, and outputs an A-through-WT signal which enables the data of the master 1A to be written in response to the through signal, an AND gate circuit 52 which simultaneously receives a through signal B to A and a write set signal (B-WT-SET) of the master 1B, a register means 54 that receives an output from the AND gate circuit 52 and an address signal (B-ADD) of the master 1B, a comparator 55 which receives an output of the register means 54 and an address signal (A-ADD) of the master 1A, and an AND gate circuit 56 which receives an output from the comparator 55, a write signal (A-WRITE) of the master 1A and an address data strobe signal (A-ADS), wherein one output of the AND gate circuit 56 is input to an OR gate circuit 65 and the other output thereof is connected to the input of an inverter 57, and the output of the inverter 57 is fed back to the input of the register means 54 via a flip-flop 58.

The internal circuit is constituted by an AND gate circuit 59 which simultaneously receives a through signal C to A and a write set signal (C-WT-SET) of the master 1C, a register means 60 which receives the output of the AND gate circuit 59 and an address signal (C-ADD) of the master 1C, a comparator 61 which receives an output of the register means 60 and an address signal (A-ADD) of the master 1A, and an AND gate circuit 62 which receives an output from the comparator 61, a write signal (A-WRITE) of the master 1A and an address data strobe signal (A-ADS), wherein one output of the AND gate circuit 62 is input to the OR gate circuit 65, and another output is connected to the input of the inverter 63, and the output of the inverter 63 is fed back to the input of the register means 60 via a flip-flop 64.

The OR gate circuit 65 receives the outputs of the AND gate circuits 56 and 62, and outputs an A-through-RD signal for reading the data of the master 1A.

The circuits in the through judging means corresponding to the masters 1B and 1C are constituted in the same manner as described above, and are not described again.

When the operation of the through judging means 83 of the present invention is mentioned with reference to the master 1A, the A-through-WT is asserted when the through A to B or A to C is asserted and when A-WRITE is asserted. Furthermore, the A-through-RD is asserted when B-ADD latched by Rg at a timing when B-WT-SET is asserted is equal to A-ADD of during the reading while the through B to A is asserted, or when C-ADD latched by Rg at a timing when C-WT-SET is asserted is equal to A-DD of during the reading.

Figure 5:
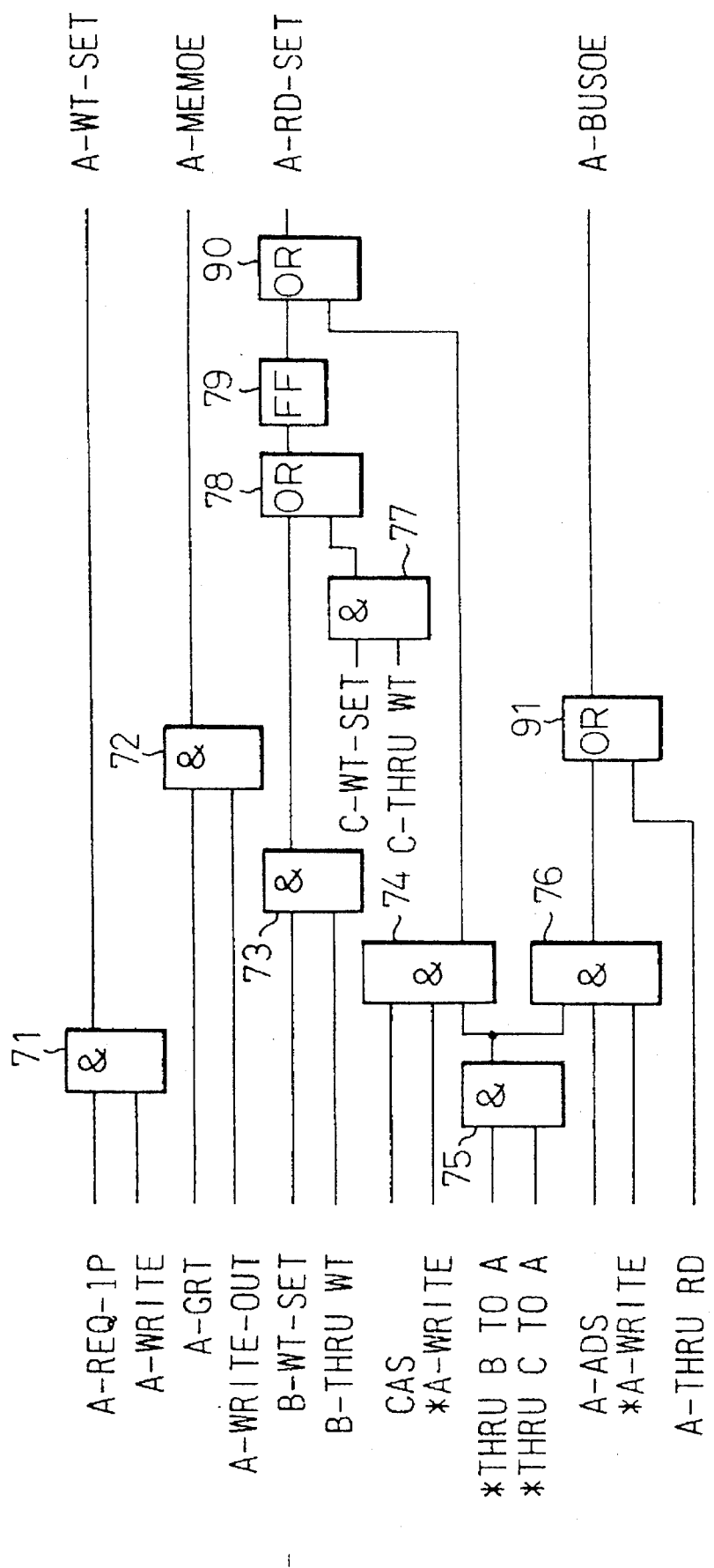
FIG. 5 is a block diagram for illustrating the concrete constitution of a data buffer controller used in the present invention.

Next, described below with reference to FIG. 5 are the constitution and operation of the data buffer controller 84 that is used in the through transfer mode register 8 of the present invention.

FIG. 5 is a block diagram which schematically illustrates the constitution of the data buffer controller 84 used in the present invention. When the right for using the memory data bus is given in response to a request of writing the data from a master, data buffer controllers 84A, 84B and 84C used in the data transfer control means 8 of the present invention work to assert a storage control signal of a read register in the data buffer of another master.

When the right for using the memory data bus is given in response to a request of reading the data from a master, the data buffer controllers further work to assert an output control signal to the memory data bus in the data buffer means of another master.

The data buffer controllers according to the present invention are provided with a data buffer A controller 84A, a data buffer B controller 84B and a data buffer C controller 84C that correspond to the masters 1A, 1B and 1C, and their internal constitutions are the same. Therefore, the data buffer A controller 84A will be described here, and other data buffer controllers are not explained.

That is, the data buffer A controller 84A is constituted by an AND gate circuit 71 which receives the above-mentioned signals A-REQ-1P and A-WRITE and outputs a write set signal A-WT-SET, an AND gate circuit 72 which receives an A-GRT signal and an A-WRITE-OUT signal which are right-of-using-memory-data-bus signals given to the master 1A, and outputs an A-MEMOE signal for enabling the memory means, an AND gate circuit 73 which receives a B-WT-SET signal and a B-through-WT signal, an AND gate circuit 74 which receives a CAS signal and an *A-WRITE signal inverted from the A-WRITE signal, an AND gate circuit 75 which receives a *through B to A signal and a *through C to A signal, and an AND gate circuit 76 which receives an A-ADS signal and an *A-WRITE signal. The output of the AND gate circuit 75 is input to the AND gate circuits 74 and 76, the output of the AND gate circuit 74 is input to the OR gate circuit 90 that will be described later, and the output of the AND gate circuit 76 is input to an OR gate circuit 91 that will be described later.

The output of the AND gate circuit 73 is input to the OR gate circuit 78 together with the output of the AND gate circuit 77 which receives the C-WT-SET signal and the C-through-WT signal. The output of the OR gate circuit 78 is input via a flip-flop circuit 79 to the OR gate circuit 90 together with the output of the AND gate circuit 74. The OR gate circuit 90 outputs an A-RD-SET signal.

The output of the AND gate circuit 76 is input to an OR gate circuit 91 together with the A-through-RD signal, and the OR gate circuit 91 outputs an A-BUSOE signal.

Operation of the data buffer A controller 84A will now be described. The signal A-WT-SET is asserted when the signals A-REQ-1P and A-WRITE are being asserted. Furthermore, the signal A-MEMOE is asserted while the signals A-GRT and A-WRITE-OUT are asserted. The signal A-RD-SET is asserted at the same timing as the CAS for the memory at the time of reading the data not in the through access mode, being lagged by one cycle behind the B-WT-SET or the C-WT-SET of in the through access mode. The signal A-BUSOE is asserted when A-ADS and *A-WRITE are asserted not in the through access mode and when the through-RD is asserted in the through access mode. The same holds even for the data buffer B controller and the data buffer C controller.

Described below is the constitution of the DTACK-forming circuit 85 that is used for generating a DTACK signal in the through transfer mode register 8 of the present invention.

That is the DTACK signal is the one which represents the state in which in transferring the data from a master, the predetermined data is stored in a predetermined memory or a data buffer after the data is output together with the ADS signal, and the data is ready to be transferred at any time upon receipt of a read signal. The master which has transferred the data may carry out another operation processing upon receiving the DTACK signal.

Figure 9:
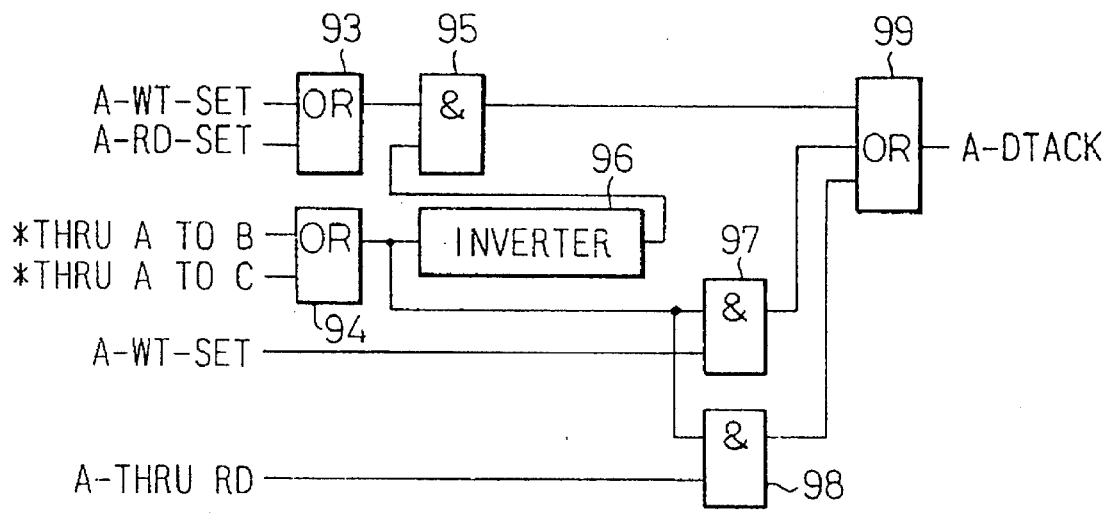
FIG. 9 is a block diagram for illustrating the concrete constitution of a DTACK-forming means used in the present invention.

FIG. 9 illustrates a concrete constitution of the DTACK-forming circuit 85 of the present invention, which comprises an OR gate circuit 93 which receives the A-WT-SET signal and the A-RD-SET signal, an OR gate circuit 94 which receives the through signal A to B, a *through signal A to B inverted from the through signal A to C and a *through signal A to C, an AND gate circuit 95 which receives a signal obtained by inverting an output of the OR gate circuit 94 through an inverter 96 and further receives an output of the OR gate circuit 93, an AND gate circuit 97 which receives an output of the OR gate circuit 94 and the A-WT-SET signal, an AND gate circuit 98 which receives an output of the OR gate circuit 94 and an A-through-RD signal, and an OR gate circuit 99 which receives outputs from the AND gate circuits 95, 97 and 98 and outputs an A-DTACK signal.

The DTACK-forming circuits 85 are provided to correspond to the masters 1A, 1B and 1C, and are constituted in the same manner.

Here, the operation of the DTACK-forming circuit 85A is explained. In a mode other than the through access mode, the A-DTACK signal is asserted being delayed by one cycle behind the signal A-WT-SET or the signal A-RD-SET. In the through access mode, the signal A-DTACK is asserted when the signal A-WT-SET or the signal A-through-RD is asserted.

Then, a memory control signal-forming means 88 used in the data transfer control means 8 of the present invention receives A, B, C-GRT and A-WRITE, and forms a control signal for the memory. When the memory is, for example, a DRAM, the memory control signal-forming means 88 forms RAS, CAS, WE address select signal (RAS address, CAS address select) and MEM-BUS-END that is asserted at a moment when the memory cycle is finished.

Figure 10:
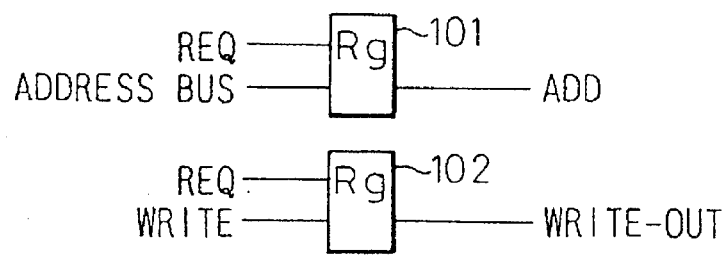
FIG. 10 is a block diagram for illustrating the concrete constitution of an address buffer used in the present invention.

The address buffer 89 used in the data transfer control means 8 of the present invention has a circuit constitution as shown in FIG. 10, in which suitable register means 101 and 102 are arranged. When a request signal REQ output upon the decode request is asserted, the address buffer 89 latches a signal of the address bus and further latches a WRITE signal, and output signals ADD and WRITE-OUT.

Figure 11:
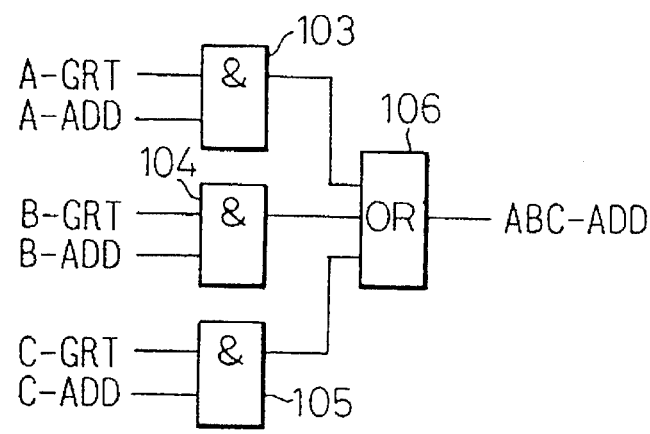
FIG. 11 is a block diagram for illustrating the concrete constitution of an address selector used in the present invention.

FIG. 11 illustrates the circuit constitution of an address selector 86 used in the data transfer control means 8 of the present invention.

The address selector 86 is constituted by three AND gate circuits 103 to 105 and one OR gate circuit 106, and each AND gate circuit receives a right-to-use signal GRT and an input address signal ADD.

The address selector outputs the address (ABC-ADD) of an asserted right-to-use signal GRT out of the three input addresses (ADD).

Figure 12:
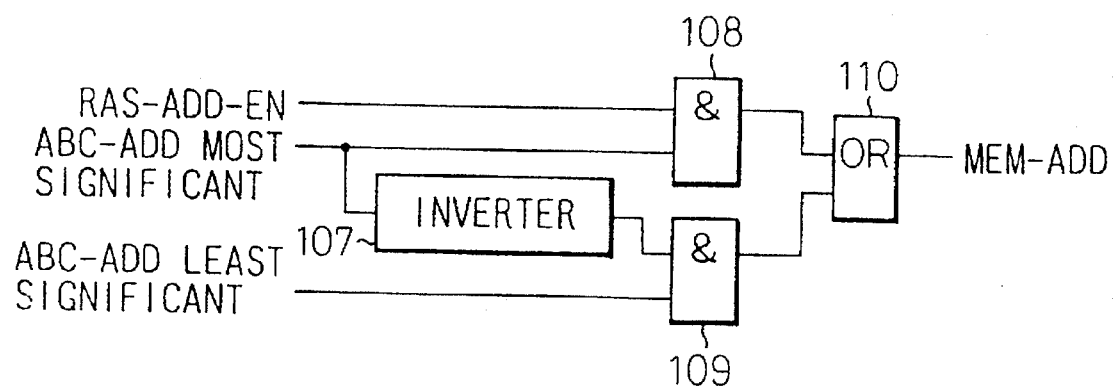
FIG. 12 is a block diagram for illustrating the concrete constitution of the address selector used in the present invention.

Described below is a memory address-forming means 87 used in the data transfer control means 8 of the present invention. FIG. 12 is a block diagram illustrating the circuit constitution of the memory address-forming means 87 according to an embodiment of the present invention.

That is, the memory address-forming means 87 is constituted by an AND gate circuit 108 that receives a RAS-ADD-EN signal from the memory control signal-forming means 88 and the most significant address (ABC-ADD) signal from the address selector 86, and an AND gate circuit 109 which receives a signal inverted from the RAS-ADD-EN signal of the memory control signal-forming means 88 through an inverter 107 and receives the least significant address (ABC-ADD) signal from the address selector 86. Furthermore, an OR gate circuit 110 receives the outputs from the AND gate circuits 108 and 109, and outputs a RAS address and a CAS address as addresses (MEM-ADD) of the memory.

The memory address-forming means 87 outputs an address to the memory. When the memory is a DRAM, the memory address-forming means 87 inputs an address select signal and outputs a RAS address and a CAS address to the memory in response thereto.

Here, an embodiment for transferring the data by using the data transfer apparatus of the present invention shown in FIG. 1 will be described with reference to timing charts of FIGS. 13 and 14.

Concretely speaking, the data transfer control circuit 8 is provided with a through transfer mode for transferring the data without passing through the memory, and access is made to an address assigned to the register in order to set a mode A⇌B through/B⇌C through/C⇌A through' to the register. For example, when the host of the master 1A is written onto an address (X) after the mode of A⇌B through has been set, the set signal (A-WT-SET) of the register is asserted for one period (1τ) when the input register on the bus side of the data buffer A is empty as shown in FIG. 13. After the right (A-GRT) of using the memory bus is asserted, the output enable (A-MEMOE) on the side of the memory bus is asserted and the data is output to the memory bus. Immediately thereafter, the set signal (B-RD-SET) of the input register on the memory bus side of the data buffer B is asserted for one period (1τ). In this case, furthermore, the address (X) is stored in the through address register. Then, as the host B reads the address (X), the output enable on the side of the data bus B is asserted when the addresses are equal to each other (X=Y), and a value of the input register on the memory bus side of the data buffer B is output to the data bus B. It is further allowable to read and write the data between the hosts and the memory as shown in FIG. 14 without changing the constitution of the data buffer.

The transfer of data will be described in further detail with reference to FIG. 13 which illustrates the case where the predetermined data is to be transferred from the master 1A to the master 1B. First, the master 1A outputs an address signal A-ADS of the data that is to be transferred and, at the same time, outputs a write signal A-WT-SET for writing the data into the data buffer means 3A.

In the data transfer control means 8, the data is stored in the predetermined data buffer means 3A and a signal A-DTACK is output indicating that the data can be transferred to the master 1B at any time.

At the same time, the arbiter means 82 in the data transfer control means 8 outputs a signal A-GRT for giving the right of using the memory data bus 4 to the master 1A, and a signal MEMOE is given to the data buffer 3A that corresponds to the master 1A to permit the feeding of data into the data transfer path in the memory data bus 4.

In the data transfer apparatus of the present invention shown in FIG. 1, the data output from the master 1A is stored in the data buffer means 3A and is at the same time acquiring the right of using the memory data bus 4. Therefore, the data is arriving at the output terminal 4B of the data buffer means 3B that corresponds to the master 1B.

In this case, therefore, a data transmission path for transferring the data is formed by the output end 4A of the data buffer means 3A, output terminal 4B of the data buffer means 3B and by part of the instruction decoder 4.

Therefore, the data from the master 1A is not once stored in the shared memory 5 but is directly transferred to the master 1B.

Then, the master 1B outputs a signal B-RD-SET to the data buffer means 3B to read the data from the data buffer means 3A and, at the same time, outputs an address signal B-ADS. Here, it is judged whether the address is in agreement with the address of the data output from the master 1A. When they are in agreement, the data arriving at the output terminal 4B of the data buffer means 3B is read into the data buffer means 3B in response to a read start signal B-BOSOE and the transfer of data is completed.

According to the present invention, the data of the master 1A which is acquiring the right of using the memory data bus 4 is arriving at the output terminal 4B of the data buffer means 3B. Without passing through the memory means 5 and without executing any processing for acquiring the right for using the memory data bus 4, therefore, the master 1B is allowed to directly read the data making it possible to greatly shorten the time for transferring the data.

In the present invention, the master 1C may output a signal for transferring the data or for reading the data while the above-mentioned data is being transferred. However, the master 1C is allowed to acquire the right of using the memory data bus 4 only after the data transferred over the memory data bus 4 is read out by the master 1B. Therefore, collision of data is completely avoided and the reading operation of the master 1B is not hindered.

FIG. 14 illustrates the transfer of data between a master and the memory 5 using the data transfer apparatus of the present invention. The memory means 5 used here is similar to that of the prior art but what makes a difference from the conventional system is that even when signals for transferring the data or reading the data are output simultaneously or at slightly deviated timings from the masters 1A, 1B and 1C, the right for using the memory data bus 4 is so controlled that the data of only one master is allowed to use the memory data bus 4 at one time, avoiding the collision of data and delay of operation time that were the problems inherent in the prior art.

Described below is another embodiment of the data transfer apparatus of the present invention.

In the data transfer apparatus according to the second embodiment of the present invention, data storage element means 9 capable of storing predetermined data are connected to the data buses 2 connected to the masters 1A, 1B and 1C, and the data output from the masters are directly transferred, without passing through the memory means, to the data storage element means 9 connected to the data buses linked to the other masters to which the data are to be transferred.

It is desired that the data storage element means 9 is constituted by, for example, a register having a first-in, first-out (FIFO) function.

Figure 16:
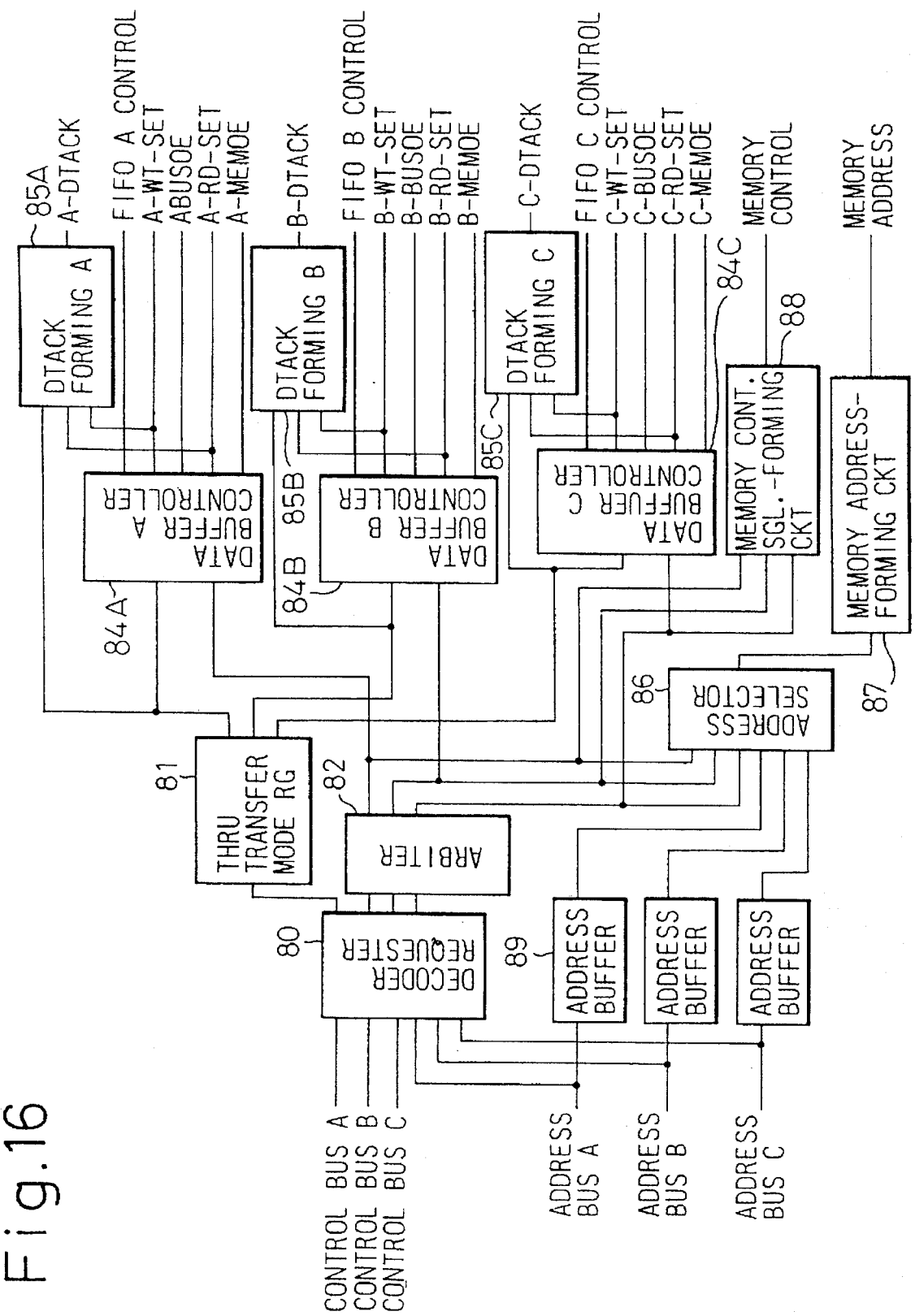
FIG. 16 is a block diagram for illustrating the concrete constitution of the data transfer control means used in the second embodiment of the present invention.
Figure 20:
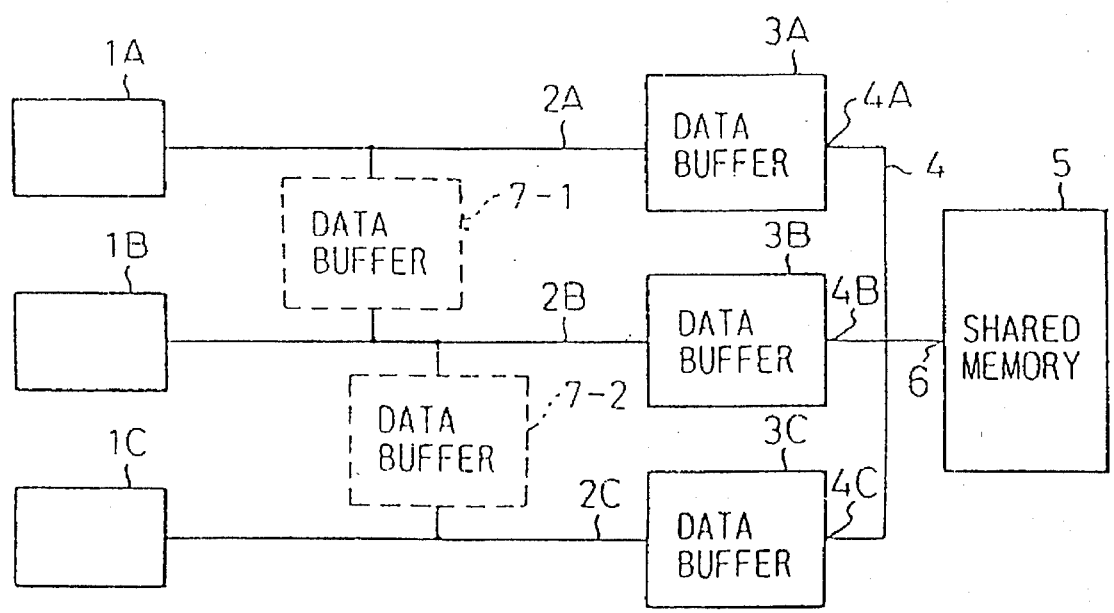
FIG. 20 is a block diagram for illustrating the constitution of a conventional data transfer apparatus.
Figure 21A:
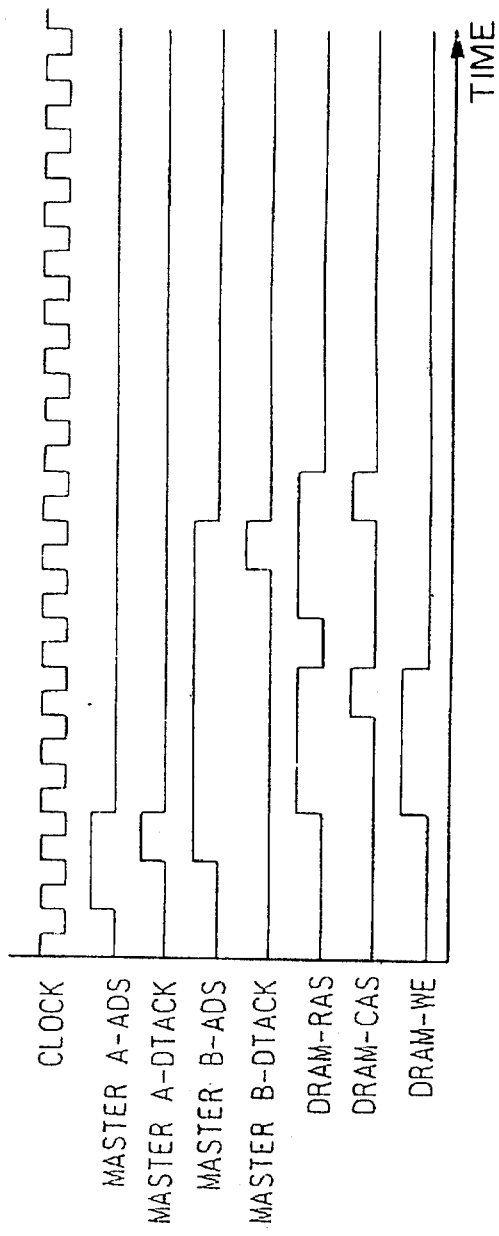
FIG. 21A is a timing chart for illustrating the operation procedure in the case where no access is requested from a further master while the data is being transferred between the masters in the prior art.
Figure 21B:
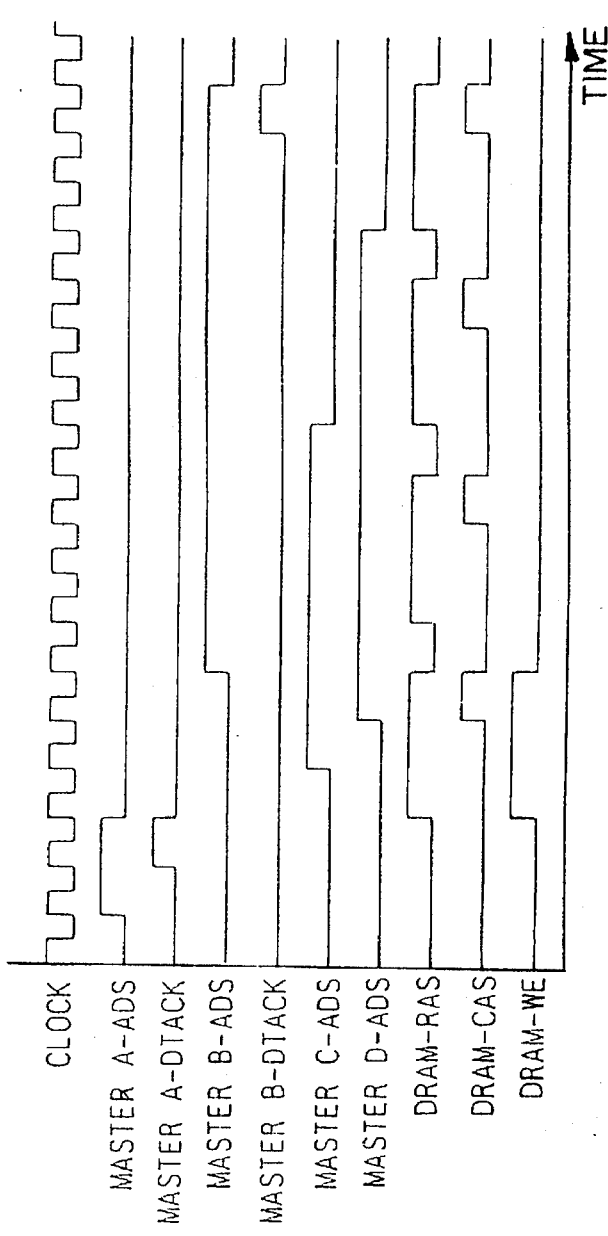
FIG. 21B is a timing chart for illustrating the operation procedure in the case where access is requested from a further master while the data is being transferred between the masters.

FIG. 15 is a block diagram which schematically illustrates the constitution of the second embodiment of the present invention, and FIG. 16 is a block diagram which illustrates in further detail the constitution of the second embodiment of the present invention.

Figure 18:
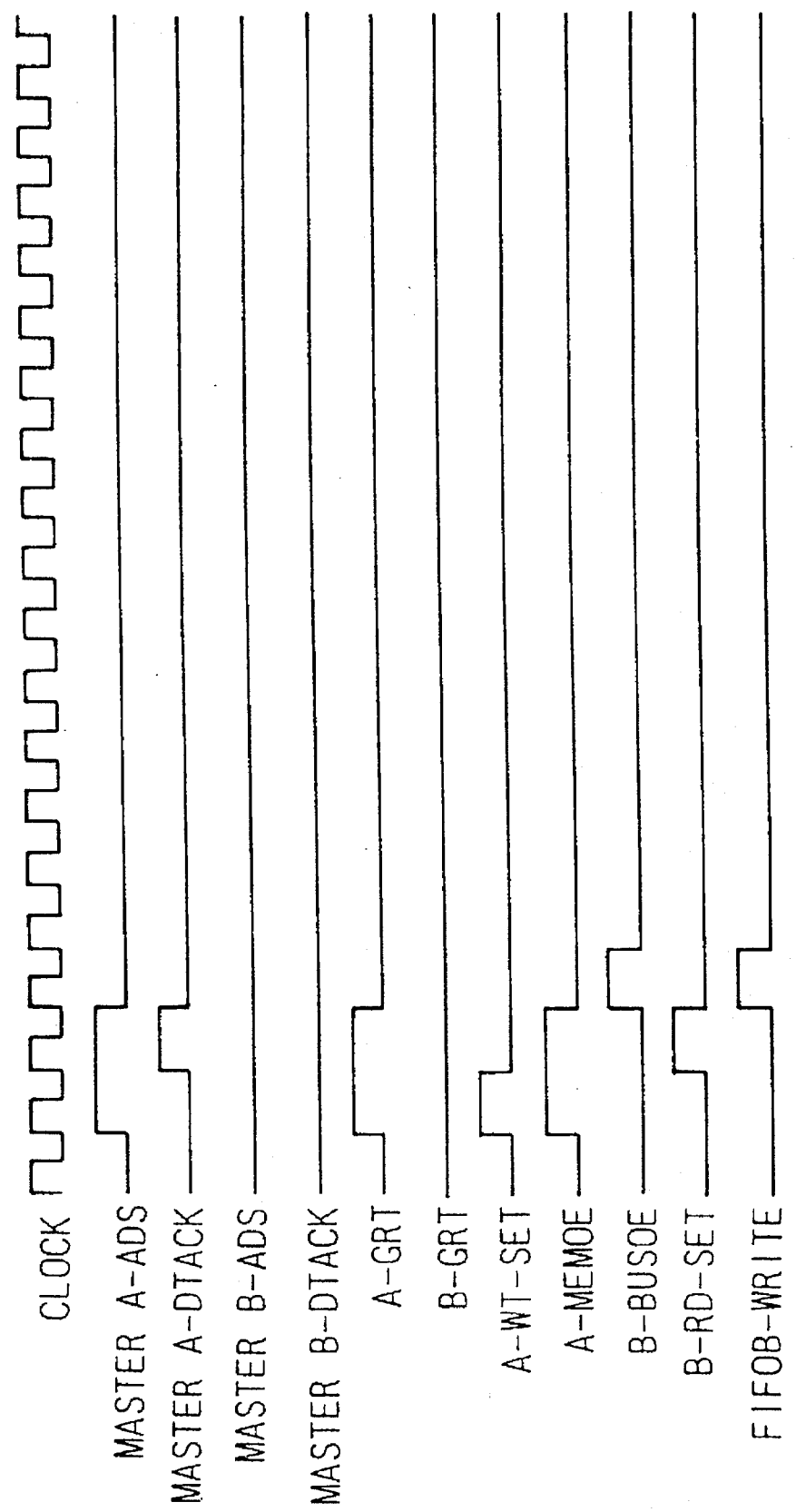
FIG. 18 is a timing chart for illustrating the procedure of the data transfer system according to the second embodiment of the present invention.

What makes the second embodiment different from the aforementioned embodiment is that the data written by a host while a through access is being requested, is stored in a storage element such as FIFO to which is connected the data bus of a host to which the data is to be transferred, and the host that is going to receive the data need not read the data. Different portions will now be described. First, since the data need not be read in the through access mode, the arbiter 82 forms GRT for all of A, B, C-REQs. Next, there is no need to make sure that the write address and the read address are in agreement, and there is no need to effect the through judgement. The data buffer controller 84 forms a signal that is delayed by one cycle behind the signal RD-SET asserted at the time of writing the data for the through access, as a WRITE signal (FIFOA-WRITE in the case of A) for the FIFO 9. In this case, furthermore, BUSOE is asserted. When DTACK is formed, there is no chance for reading the data in the through access. FIG. 18 is a time chart of during the through access of this case.

Next, briefly described below are the means used in the second embodiment of the present invention, which are different from those of the first embodiment.

Figure 4B:
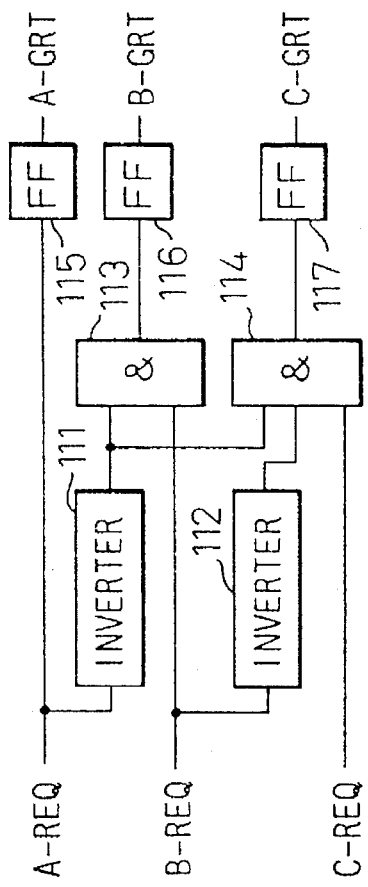
FIG. 4B is a block diagram for illustrating the concrete constitution of the arbiter means used in a second embodiment of the present invention.

FIG. 4B illustrates the constitution of the arbiter means 82 used in the second embodiment of the present invention, which, as described above, is greatly simplified compared with the arbiter means 82 of the aforementioned embodiment.

That is, the inputs are A-REQ, B-REQ AND C-REQ only and are judged by a priority order determining circuit constituted by inverters 111, 112 and AND gate circuits 113, 114 that are connected as shown, and the results are output as right-to-use-memory-data-bus signals A-GRT, B-GRT AND C-GRT via flip-flops 115 to 117.

Figure 17:
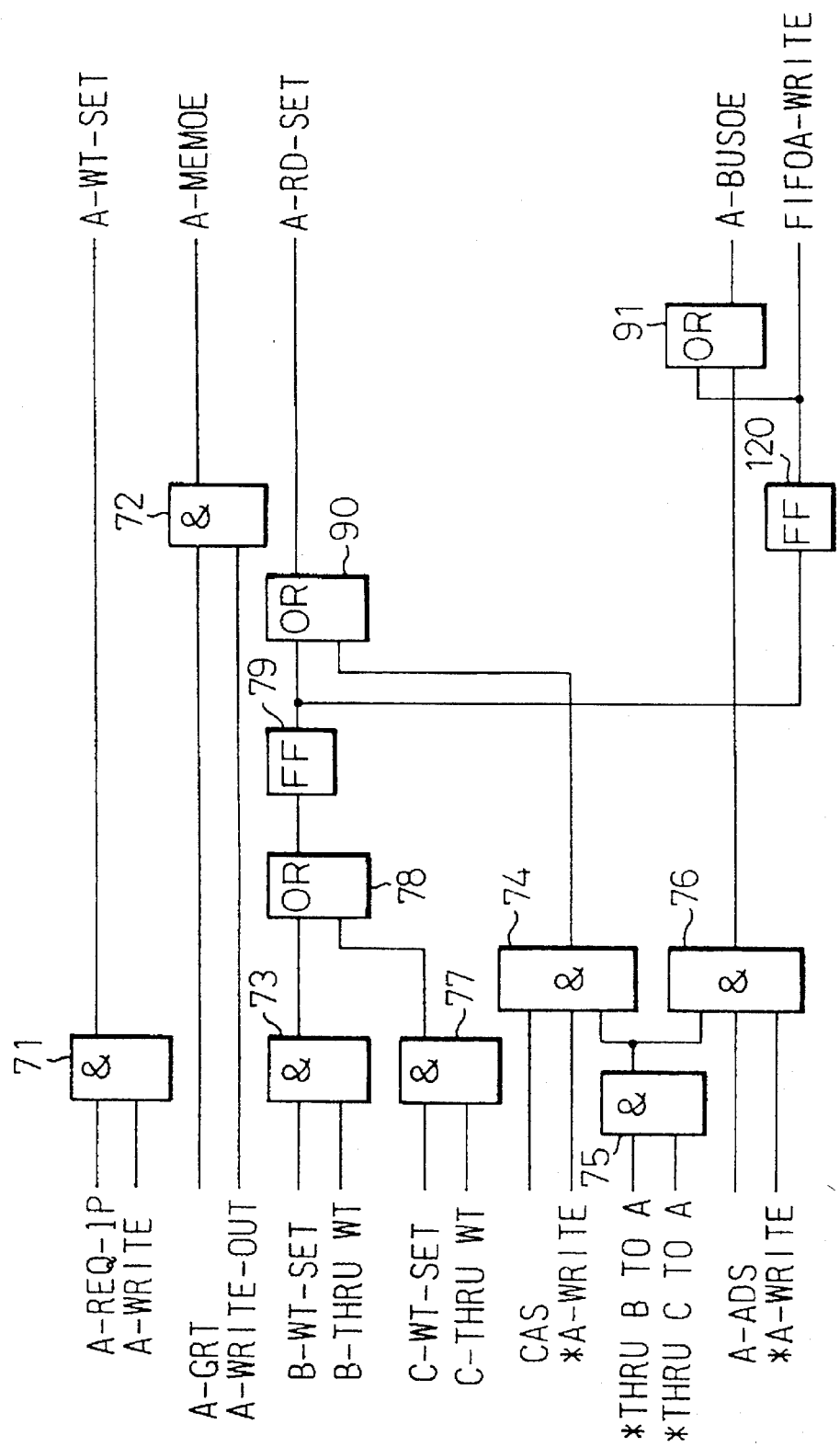
FIG. 17 is a block diagram for illustrating the concrete constitution of the data buffer controller used in the second embodiment of the present invention.

FIG. 17 illustrates the constitution of the data buffer controller 84 used in the second embodiment, which is nearly the same as that of the data buffer controller used in the first embodiment. However, what makes a difference is that no A-through-RD signal is input to the OR gate circuit 91 unlike that of the first embodiment and, instead, a flip-flop 120 is newly provided to receive the output of the flip-flop 79 and to output a new signal FIFO-A-WRITE to the OR gate circuit 91.

An operation for transferring the data from the master 1A to the master 1B according to this embodiment will now be described with reference to the timing chart of FIG. 18. First, the master 1A outputs an address signal A-ADS for transferring the data and, at the same time, outputs a write signal A-WT-SET for writing the data into the data buffer means 3A.

Then, the data transfer control means 8 outputs a signal A-DTACK indicating that the data is stored in the predetermined data buffer means 3A and can be transferred to the master 1B at any time.

At the same time, the arbiter means 82 in the data transfer control means 8 outputs a signal A-GRT for giving the right of using the memory data bus 4 to the master 1A, and outputs a signal A-MEMOE to the data buffer means 3A that corresponds to the master 1A to permit the feed of data to the data transfer path in the memory data bus 4.

Therefore, the data of the master 1A is directly transferred to the master 1B without being stored in the shared memory 5.

Then, as the master 1B outputs a signal B-RD-SET to the data buffer means 3B to read the data from the data buffer means 3A, a read start signal B-BUSOE is immediately output though no address signal B-ADS is output from the master 1B, whereby the data arriving at the output terminal 4B of the data buffer means 3B is read into the FIFO register 9 that corresponds to the data buffer means 3B, and the transfer of data is completed.

In the data transfer apparatus according to the third embodiment of the present invention, when a predetermined data is to be transferred, for example, from the master 1A to the master 1B, the data output from the master 1A is stored in the data buffer means 3A only and the data in the data buffer means 3A is read by the data buffer means 3B on the side of the master 1B through part of the memory data bus 4.

In this case, there is no need on the side of the master 1A to acquire the right for using the memory data bus 4 but it is necessary on the side of the master 1B to acquire the right for using the memory data bus 4.

In a timing chart of FIG. 19, therefore, the master 1A first outputs an address signal A-ADS for transferring the data and, at the same time, outputs a write signal A-WT-SET for writing the data into the data buffer means 3A.

In this embodiment, the data output from the master 1A is stored in the data buffer means 3A. Here, however, the master 1A does not need to acquire the right of using the memory data bus 4 and does not output the signal A-GRT. Therefore, the data stays in the data buffer means 3A.

The master 1B, on the other hand, outputs an address signal B-ADS so that the data buffer means 3B reads the data from the data buffer means 3A, whereby a B-DTACK signal is output in response thereto and a signal B-GRT is output to give right of using the memory data bus 4 to the master 1B.

Then, signals A-MEMOE and B-BUSOE are output, and the master 1B that is allowed to use the memory data bus 4 outputs a signal B-RD-SET, so that the data stored in the data buffer means 3A is read by the data buffer means 3B.

Despite the fact that some processing signals are output from the master 1C during this period, the right for using the memory data bus is not given to the master 1C. Therefore, the transfer operation is not delayed.

The data transfer system and the data transfer apparatus according to a further embodiment of the present invention will be described next.

The aforementioned data transfer system and the data transfer apparatus of the present invention made it possible to provide a method and means for operating the data at high speeds when accesses are made in a random fashion to the shared memory means 5 from a plurality of devices 1, i.e., from a plurality of masters 1A, 1B and 1C that include a CPU.

By using the above method and means, a plurality of write access signals and read access signals may be input in a random fashion to the data transfer apparatus from a plurality of masters 1A, 1B, 1C, - - - . When a write access signal is stored by a predetermined register circuit for writing, the DTACK which is a signal for permitting the use of a predetermined data bus is output and the data bus is able to accept the next access signal. Even when a read access signal is output, however, the DTACK is not output unless it is stored by a register circuit for reading; i.e., storage of the read access signal by the read register circuit must be waited for and an extended period of time is required for the operation processing.

That is, in a data transfer system in which a plurality of masters 1A, 1B, 1C, - - - make accesses to the shared memory means 5, a time-out error occurs when none of the masters respond thereto for more than a predetermined period of time. In this case, a time-out has generally been determined for the host which is used as one of the masters for the shared memory in an accelerator connected to the host computer, and a response must be sent back within this predetermined period of time.

The write access can be carried out at a high speed if the data are stored. The larger the number of buffers, the higher the performance for operating the access signals for writing the data.

In the conventional data transfer system, on the other hand, the write access signals and the read access signals input to the data transfer system are basically subjected to processing without changing their order.

Figure 22:
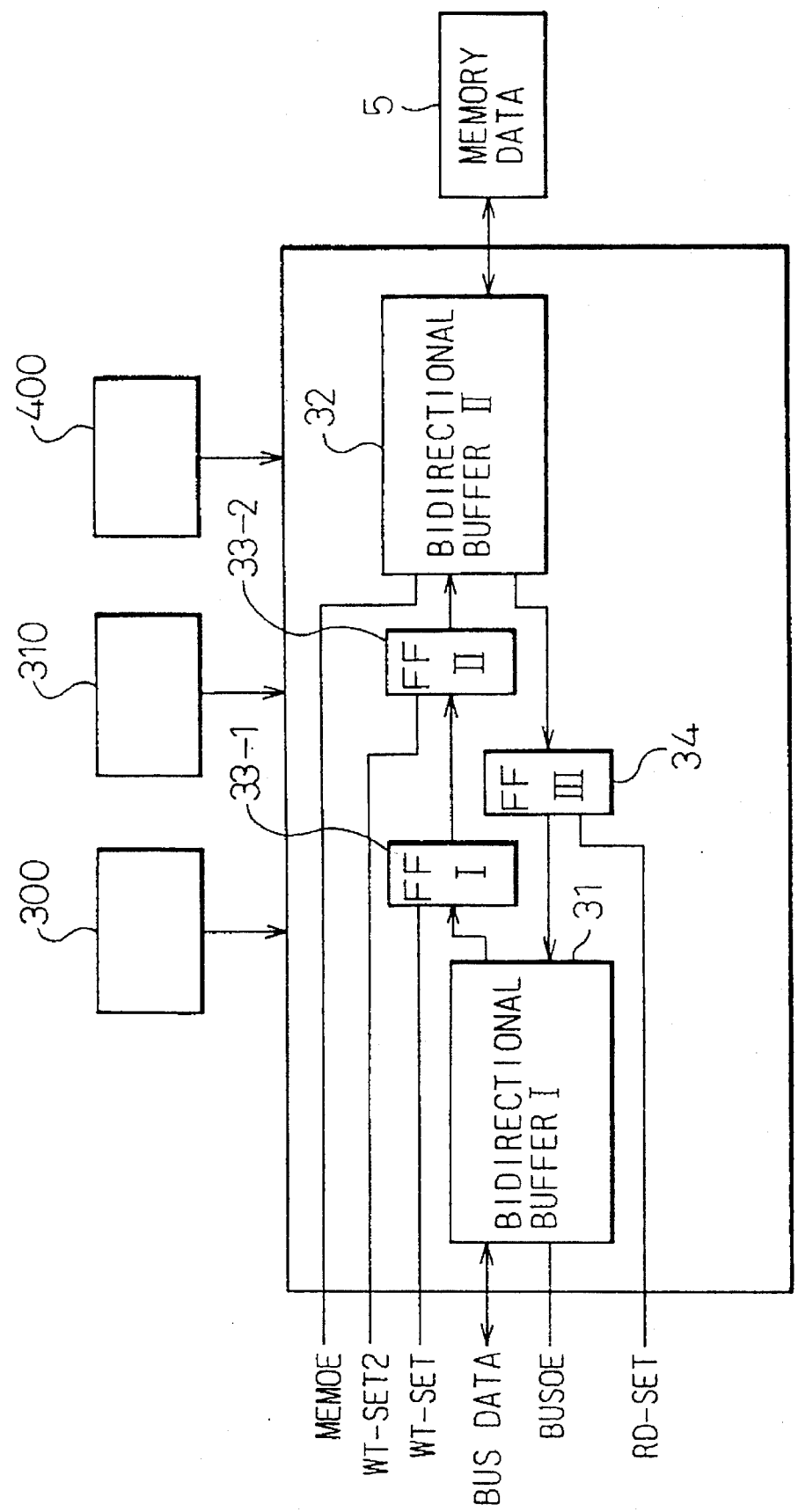
FIG. 22 is a block diagram for explaining the problem in the data-holding means in the case when a plurality of write access signals and read access signals are output in succession according to the present invention.

In order to solve the above problem based on such a prerequisite, therefore, a method can be contrived in which the register circuits 33 for writing in the data transfer apparatus of FIG. 2 of the embodiment of the present invention are arranged in a plural number in series as shown in FIG. 22, and the input access signals are sent to the operation processing while being successively shifted among the plurality of register buffers.

That is, the data transfer apparatus of FIG. 22 comprises a plurality of devices i(A, B, C, - - - ), at least one shared memory means 5, a plurality of data-holding means 3A, 3B, 3C, - - - provided corresponding to said plurality of devices 1, data buses 2A, 2B, 2C, - - - provided between said devices and said data-holding means corresponding to said devices, memory data buses 4A, 4B, 4C provided between said data-holding means and said shared memory means, and a data transfer control means 8 which is connected to said data-holding means and to said shared memory means, wherein each of said data-holding means 3A, 3B, 3C, - - - is constituted by a first bidirectional buffer circuit 31 connected to the data buses 2A, 2B, 2C, - - - , a second bidirectional data buffer circuit 32 connected to said memory data bus, a first write register circuit 33-1 which receives the output of the first bidirectional data buffer circuit 31, a second write register circuit 33-2 which receives the output of the first write register circuit 33-1 and of which the output is connected to the second bidirectional data buffer circuit 32, and a read register circuit 34 which receives the output of the second bidirectional data buffer circuit 32 and sends an output to the first bidirectional data buffer circuit 31.

To transfer the data by using the data transfer apparatus, for example, a plurality of access signals such as write access signals W1 and W2 may be sent consecutively from the same master A to the shared memory means 5 and, then, a read access signal R1 may be sent thereto. Here, as mentioned earlier, signals can be output in response to the write access signals right after the data is received by the buffer, so that the next read access can be carried out. In response to the read access, however, the signal is not output unless data is output after having actually made an access to the memory; i.e., the signal is output only after the accesses by the two write access signals and of the read access signal to the shared memory means 5 are finished.

Figure 23:
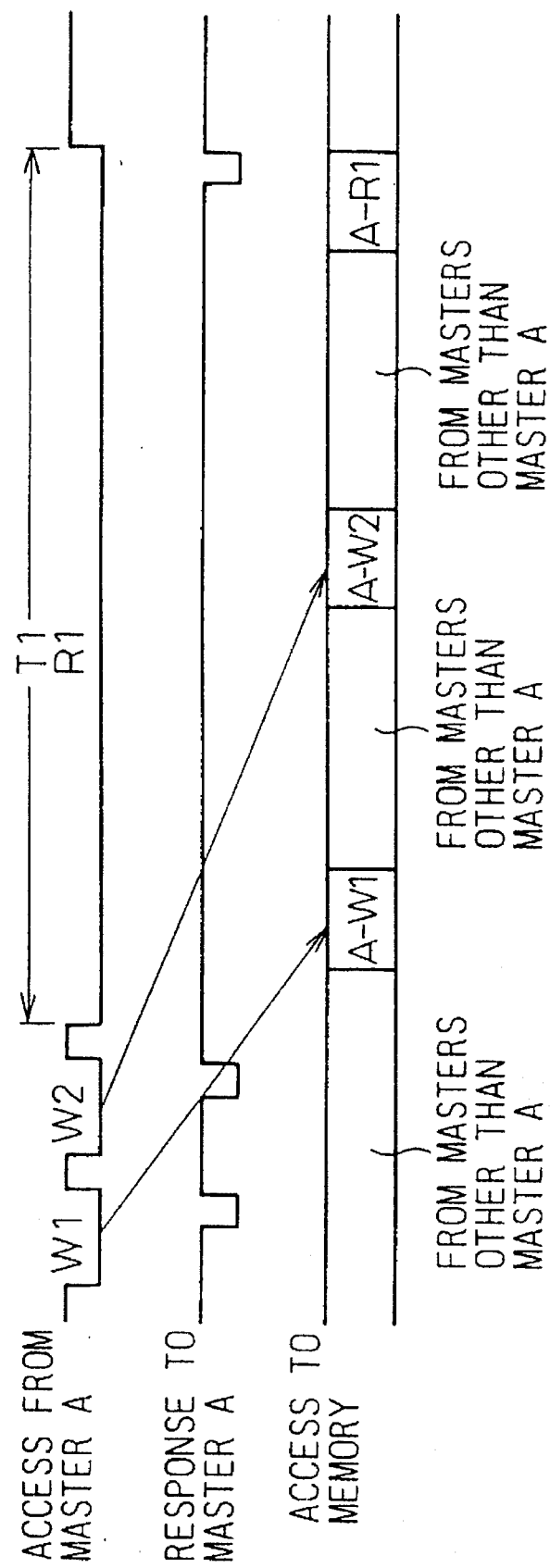
FIG. 23 is a timing chart illustrating the processings of write access signals and read access signals of when the data-holding means shown in FIG. 22 is used.

Therefore, the time required for the access becomes as denoted by T1 in FIG. 23.

When access signals are input from different masters (other than the master A) even in this case, the processing time T1 is lengthened correspondingly.

Figure 24:
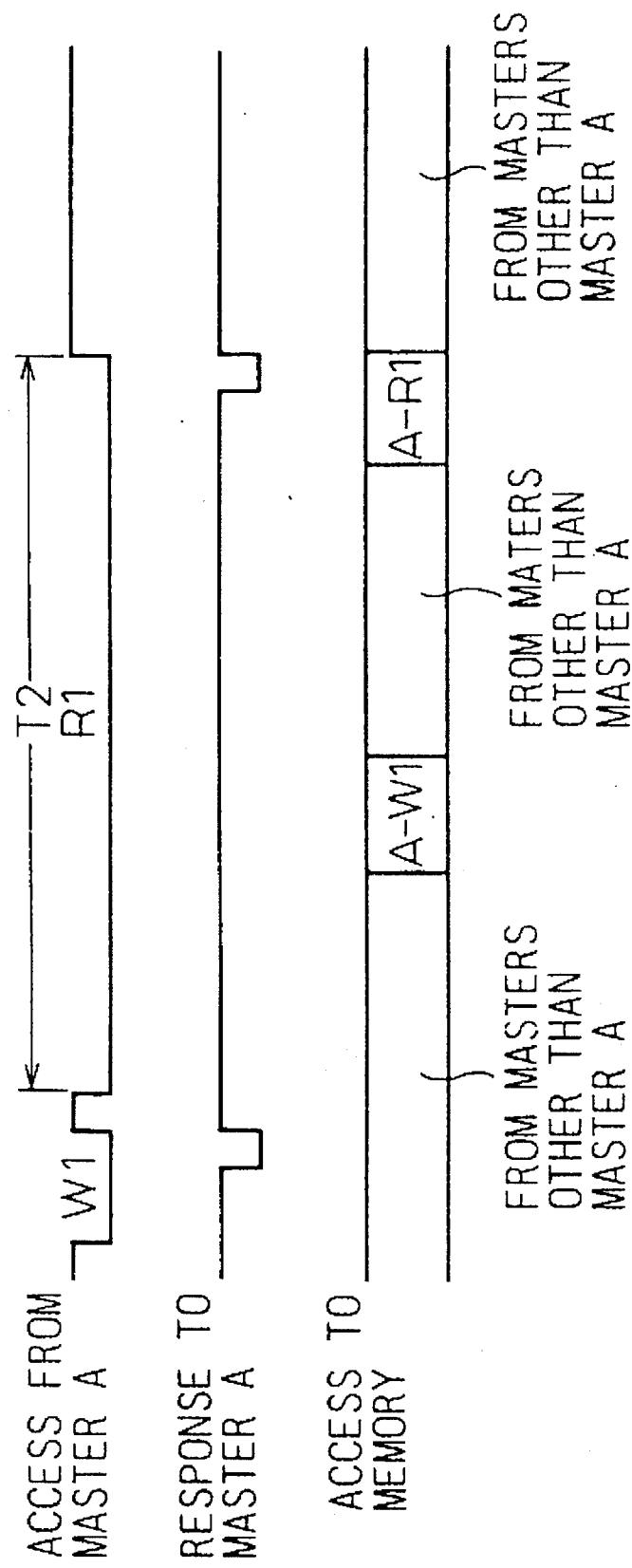
FIG. 24 is a timing chart illustrating another processings of write access signals and read access signals of when the data-holding means shown in FIG. 22 is used.

As shown in FIG. 24, furthermore, the write access signal W1 and the read access signal R1 may be alternatingly input. Even in this case, the processing time required for the read access signal becomes as denoted by T2.

When access signals are input from different masters (other than the master A) like in the above-mentioned case, the processing time T2 is lengthened correspondingly.

Lengthened access times from the masters other than the master A will be needed in the case where the memory data bus is used by the DMA for extended periods of time, in the case where there are many masters, and in similar cases.

When the access signals are successively output in a plural number, therefore, there arises problem in that a time-out easily occurs.

The data transfer system according to a fourth embodiment of the present invention solves the above-mentioned problem. That is, the invention provides a data transfer system and a data transfer apparatus which prevent the occurrence of the time-out even when the plurality of access signals are successively output, enabling the operation processing for the access to be executed at a high speed.

That is, according to a first aspect of the fourth embodiment of the present invention, the data transfer system basically maintains the same constitution as the one illustrated in FIG. 1, and wherein when access is made from at least one of the plurality of devices 1A, 1B, 1C, - - - to write predetermined data into the shared memory means 5 and to read predetermined data from the shared memory means 5 and when a write access signal W1 and a read access signal R1 are being successively input to the shared memory means 5 from the device 1A, then, access is made to the write signal, and when a read signal is output to the shared memory means 5 while said write signal is being stored in the write register circuit 33 provided in the data-holding means 2A and when the address of the write signal and the address of the read signal are not the same, the shared memory means 5 is allowed to make access to said write signal prior to making access to the write signal that is being stored in the write register circuit 33 in the data-holding means 2A. According to a second aspect of the fourth embodiment of the present invention, furthermore, when access data the same as the one mentioned above is input, access is not made to the read signal sent to the shared memory means 5 when the address of the write signal and the address of the read signal are the same, and the write signal stored in the write register circuit 33 in the data-holding means 2A is directly output as the read data to the device 1A.

The apparatus for executing the above-mentioned two kinds of data transfer systems of the present invention basically has a constitution the same as the data transfer apparatus of the invention of FIG. 1, and wherein the data-holding means 3A comprises a first bidirectional data buffer circuit 31 connected to the data bus 2A, a second bidirectional data buffer circuit 32 connected to the memory data bus 4, at least one stage of write register circuit 33 which receives an output of the first bidirectional data buffer circuit 31 and sends an output to the second bidirectional data buffer circuit 32, one stage of read register circuit 34 which receives an output from the second bidirectional data buffer circuit 32 and sends an output to the first bidirectional data buffer circuit 31, and a selector means 200 which is provided between at least one stage of read register circuit 34 and the first bidirectional data buffer circuit 31 and of which the output is connected to the input of the first bidirectional data buffer circuit 31 and of which the input is connected to the write register circuit 33 and to the one stage of read register circuit 34.

Figure 26:
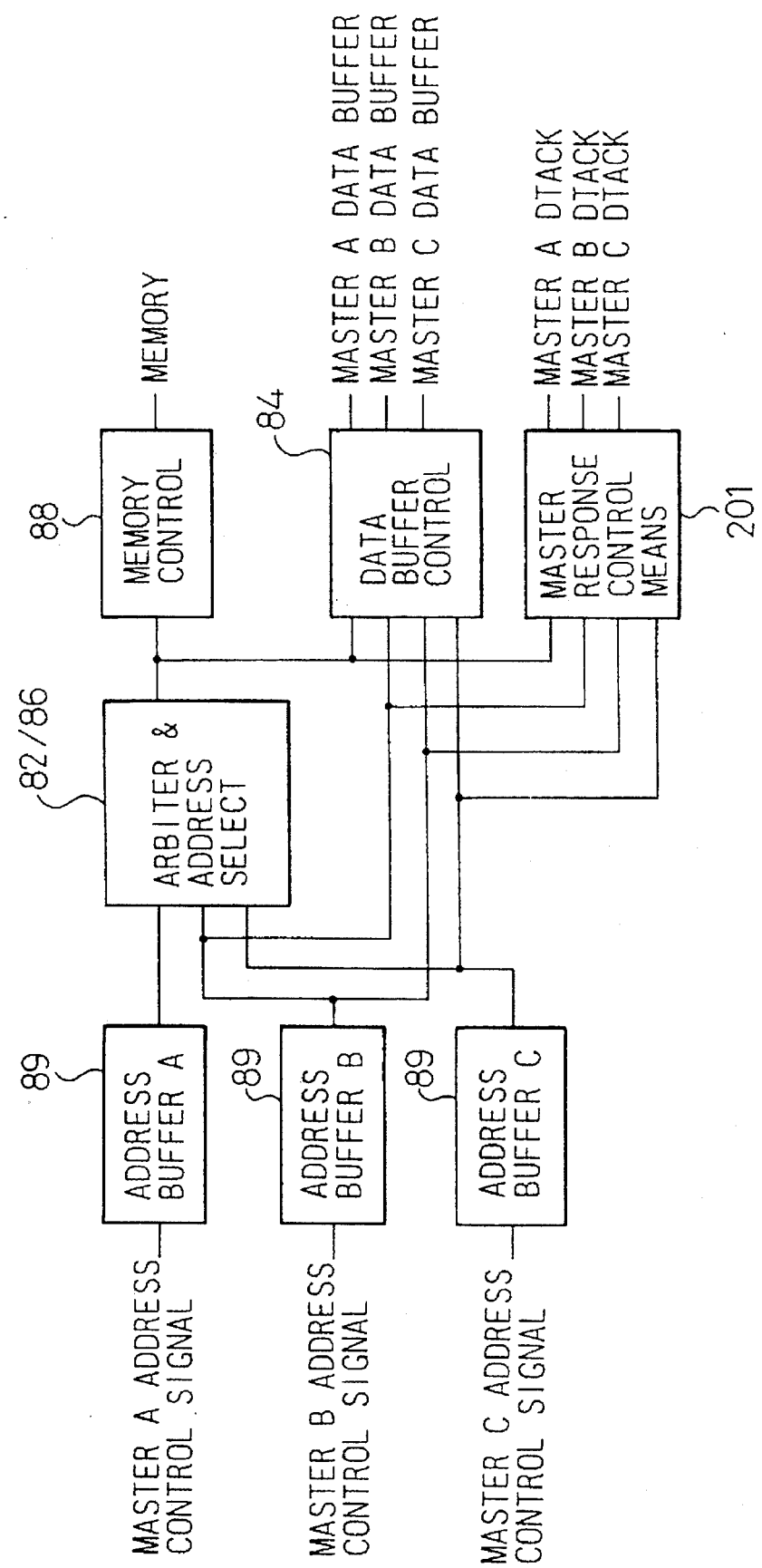
FIG. 26 is a block diagram illustrating the constitution of a memory data buffer control circuit used in the fourth embodiment of the present invention.

FIG. 26 illustrates the internal constitution of the data transfer control circuit 8 in the basically constituted data transfer apparatus of the embodiment shown in FIG. 1. Except the master response control means 201, the constitution and operation are nearly the same as those of the internal constitution of the data transfer control circuit that is shown in FIG. 3.

Figure 25:
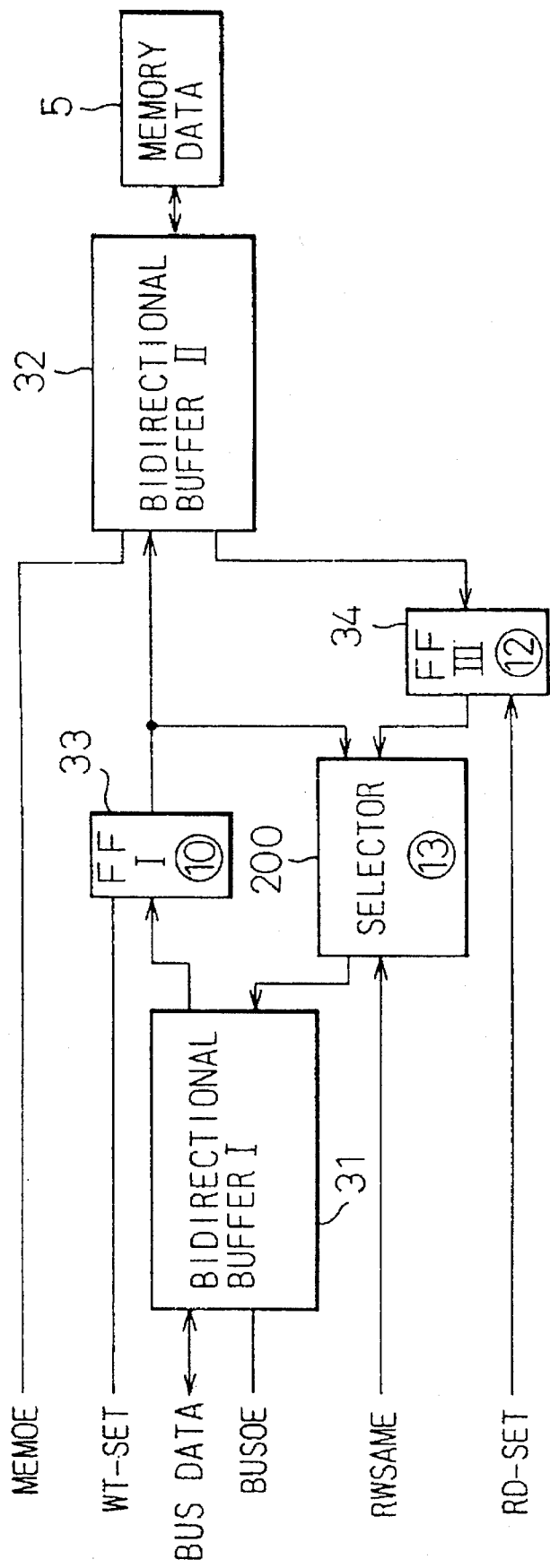
FIG. 25 is a block diagram illustrating the constitution of the data-holding means used in a fourth embodiment of the present invention.

It will be understood from FIG. 25 that the constitution of the data buffers 3A to 3C of this embodiment is different from the constitution of the data buffers of FIG. 2 which is the basic embodiment of the invention.

According to the fourth embodiment as described above, when the read access signals are input after the write register circuit 33 is placed under the full status as a result of storing the access data, the operation processing no longer maintains the order of accesses as was done in the prior art but, instead, the order of write access signals and read access signals is changed or the data is read out before the write data held in the wright register circuit 33 is stored in the shared memory means 5 in response to the write access signal.

Described below in detail is the constitution of the data transfer apparatus for executing the first and second aspects of the fourth embodiment of the present invention.

In addition to the constitution shown in FIG. 25, it is desired that the data-holding means (data buffer means) 3 in the data transfer apparatus of the present invention is provided with a write/read judging means 203 which, when a write signal W1 is sent at a first timing from a given device A to the shared memory means 5 and is stored at a second timing in the write register circuit 33 in the data-holding means 3A, judges that the read signal is sent to the shared memory 5.

Constitution and operation of the write/read judging means 203 will now be described. The write register circuit 33 indicated as FF-1 in FIG. 27 is the same as the write register circuit 33 in FIG. 25, and the write/read judging means 203 judges the arrival of the read access signal (indicated in a state where ADS and an inverted signal *Write of the Write signal in the drawing are asserted) in a state in which the write access signal is stored in the write register circuit 33.

Figure 27:
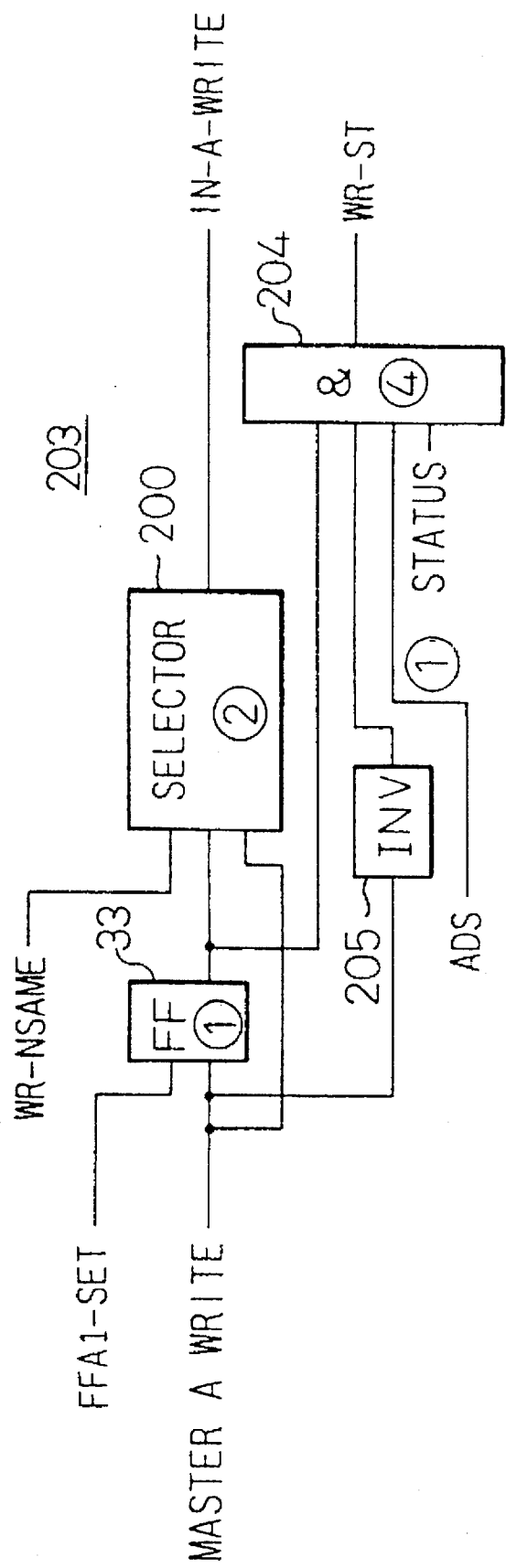
FIG. 27 is a block diagram illustrating the constitution of a write/read judging means used in the fourth embodiment of the present invention.

First, in FIG. 27, the write register circuit (FF-1) 33 latches the write signal (Write) when its status (full or empty) is empty and when FFA1-SET is asserted in the first cycle in which ADS is asserted.

The selector means 200, on the other hand, outputs the write signal (Write) of the master when the output (WR-ST) of the write/read judging means 203 has the level "H" and when the read address is not equal to the write address (i.e., when the signal RWSAME mentioned below has the level "L"), and outputs the data of the write register circuit (FF-1) 33 when the read address is equal to the write address (i.e., when the signal RWSAME mentioned below has the level "H").

The AND circuit 204 is asserted when the status of the write register circuit (FF-1) 33 is full, the output of the write register circuit (FF-1) 33 has the level "H" (i.e., Write), the ADS has the level "H" and the write signal (Write) has the level "L". That is, the AND circuit 204 judges whether the write access signal and the read access signal are input in this order.

Figure 28:
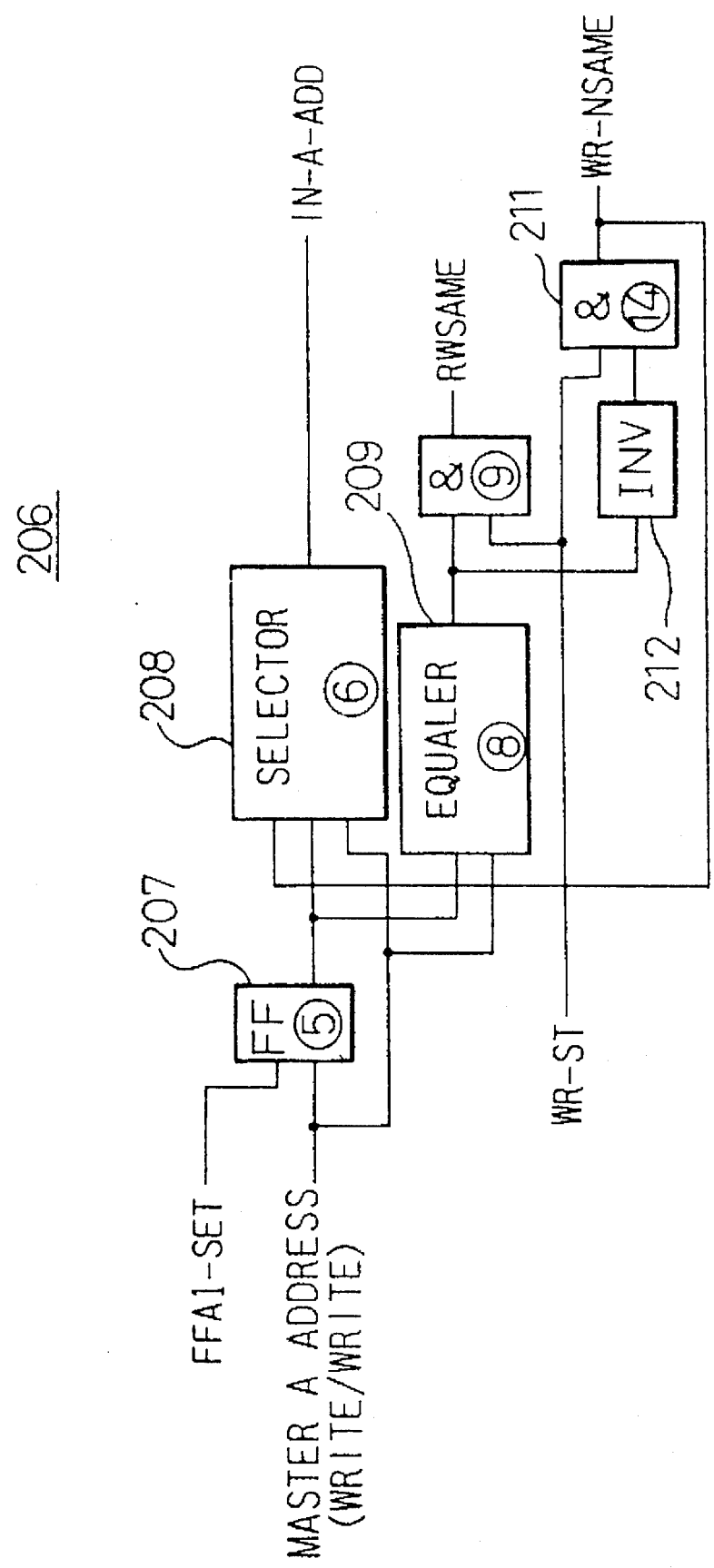
FIG. 28 is a block diagram illustrating the constitution of an address coincidence judging means used in the fourth embodiment of the present invention.

It is desired the above-mentioned embodiment of the present invention is further provided with an address coincidence judging circuit 206 that is shown in FIG. 28. In response to the output signal from the write/read judging means 203, the address coincidence judging means 206 judges whether the address of the write signal W1 output to the shared memory means 5 at the first timing coincides with the address of the read signal R1 output to the shared memory means 5.

The address coincidence judging means 206 is also called an address buffer, and its schematic constitution and operation are as shown in FIG. 28. That is, the address (Write) of the master A is latched by a register circuit 207 denoted by FF-5 when the signal FFA1-SET shown in FIG. 27 is asserted.

When the output of the AND circuit 261 has the level "L", i.e., when the write access signal W1 and the read access signal R1 that are input have different addresses, the selector circuit 208 outputs the address data of the register circuit 207 denoted by FF-5 and when the above signals have the same address, i.e., when the output of the AND circuit 261 has the level "H", the selector circuit 208 selects and outputs the address of the master A.

An equalar 209 assumes the level "H" when the address of the master A and the address of the register circuit 207 denoted by FF-5 are equal to each other. When the write address signal W1 and the read address signal R1 are input, an AND circuit 210 that obtains the AND of the output of the equalar 209 and status signal WRS of FIG. 27 outputs a signal of the level "H" as a signal RWSAME indicating that the addresses of the two signals are the same. Further, an AND circuit 211 obtains the AND of the status signal WRST and a signal which is inverted from the output of the equalar 209 through an inverter (INV) 212, and outputs a signal WRNSAME of the "L" level indicating that the write address signal W1 and the read address signal R1 that are input have different addresses.

In FIG. 25, therefore, the WRSAME signal usually has the level "L" indicating that the two signals have different addresses, and the selector means 200 outputs the value of the reade register circuit 34 as a read value to the bidirectional data buffer circuit 31. The WRSAME signal having the level "H" indicates the two signals have the same addresses, and the selector means 200 outputs the value of address of the register 207 denoted by FF-5 as a read value.

That is, when the output of the address coincidence judging means indicates that the write signal address and the read signal address are not the same, the selector means in the data transfer apparatus of the present invention works to output the signal data stored in the read register to the first bidirectional data buffer circuit. When the output of the address coincidence judging means indicates that the write signal address and the read signal address are the same, the selector means works to output the write signal data stored in the write register circuit to the first bidirectional data buffer circuit.

Described below is a fifth embodiment of the present invention in which a plurality of write address signals and read address signals are successively input in one period.

Figure 29:
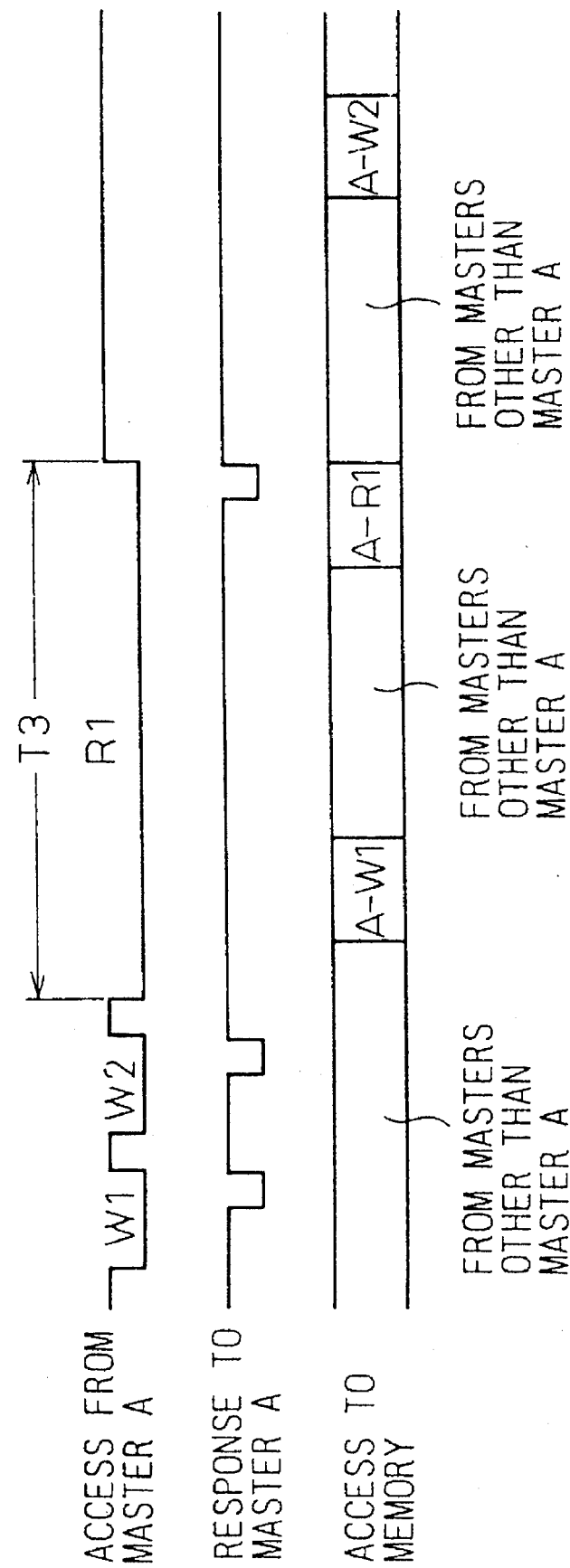
FIG. 29 is a timing chart illustrating another processings of write access signals and read access signals according to the first embodiment in the fourth embodiment of the present invention.
Figure 30:
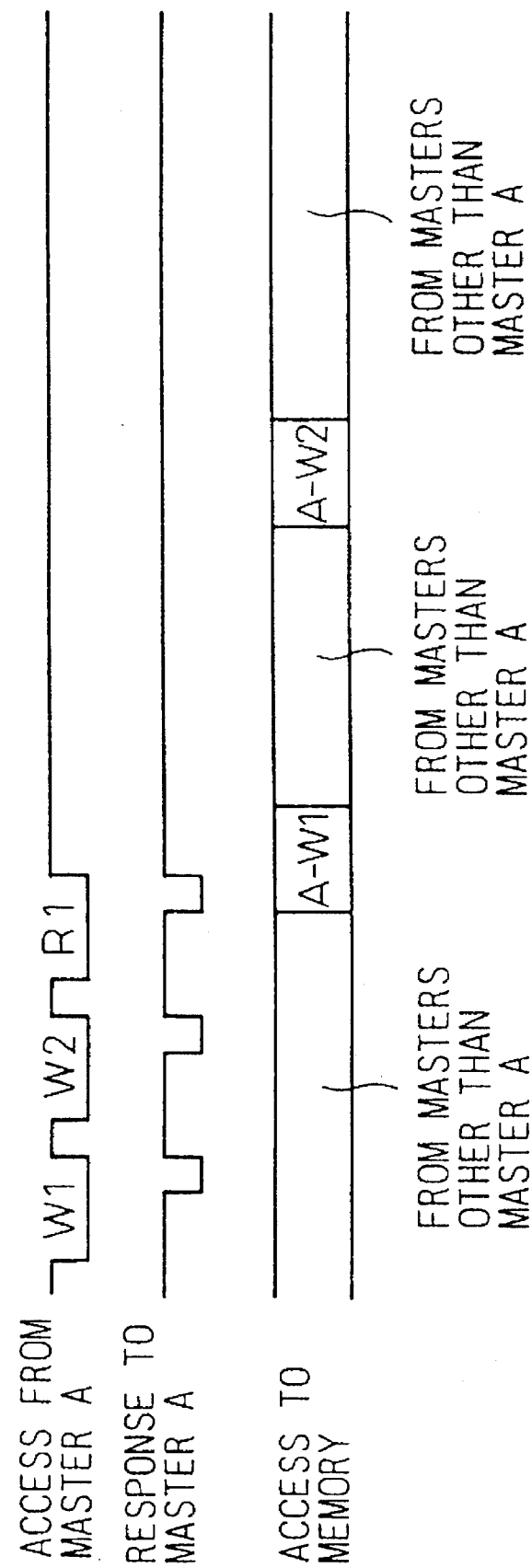
FIG. 30 is a timing chart illustrating another processings of write access signals and read access signals according to the second embodiment in the fourth embodiment of the present invention.

As shown in FIGS. 29 and 30, considered below is the case where a first write access signal W1 and a second write access signal W2 are input in this order and, then, a read access signal is input.

In this case, the first write access signal W1 is immediately stored in the write register circuit to output a DTACK signal, and there is no problem. A problem, however, arises in regard to the relation between the second write access signal W2 and the read access signal R1.

Figure 31:
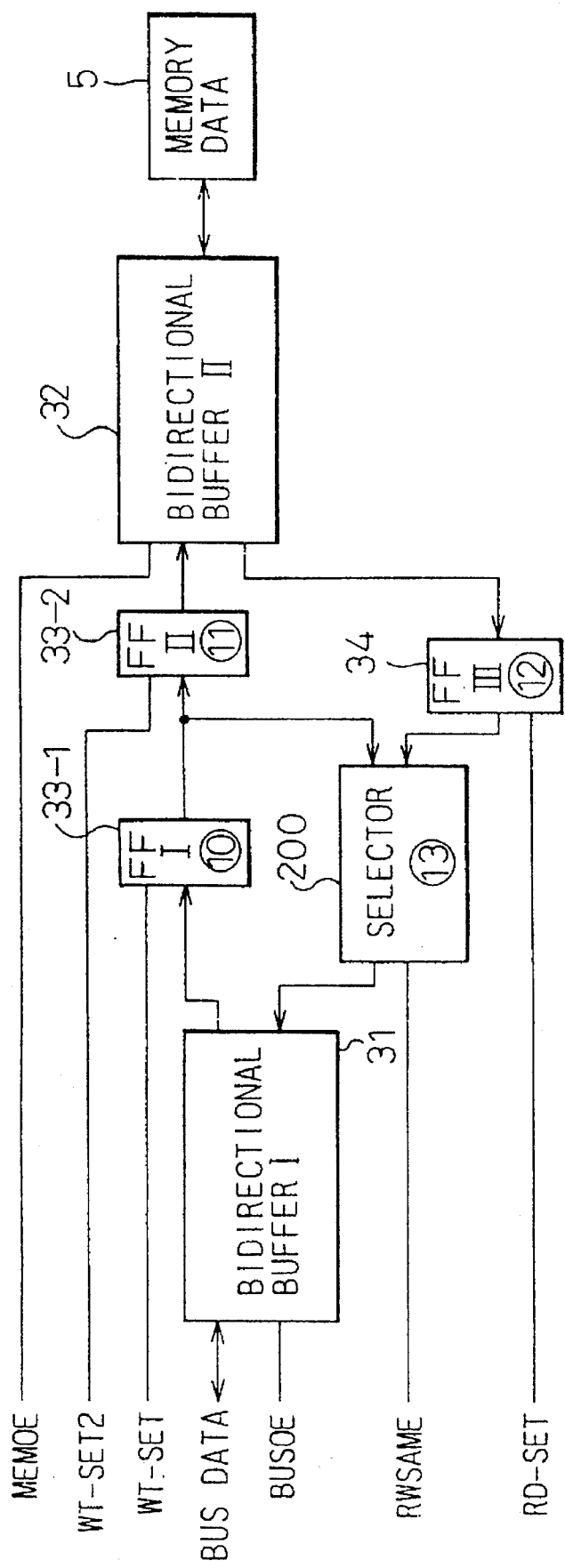
FIG. 31 is a block diagram illustrating the constitution of the memory data buffer control circuit used in a fifth embodiment of the present invention.

This embodiment, therefore, employs a data transfer apparatus in which write register circuits, i.e., write buffers are provided in two stages. As shown in FIG. 31, the data-holding means of FIG. 25 has write register circuits that are arranged in two stages in series.

That is, each of the data-holding means 3A to 3C in the data transfer apparatus used in this embodiment comprises a first bidirectional data buffer circuit 31 connected to the data bus 2A, a second bidirectional data buffer circuit 32 connected to the memory data bus 4, a first write register circuit 33-1 which receives an output of the first bidirectional data buffer circuit 31, a second write register circuit 33-2 which receives an output of the first write register circuit 33-1 and sends an output to the second bidirectional data buffer circuit 32, a read register circuit 34 which receives an output from the second bidirectional data buffer circuit 32 and sends an output to the first bidirectional data buffer circuit 31, and a selector means 200 which is provided between the read register circuit 34 and the first bidirectional data buffer circuit 31 and of which the output is connected to the input of the first bidirectional data buffer circuit 31 and of which the input is connected to the first write register circuit 33 and to the read register circuit 34.

According to the fifth embodiment of the present invention, when both the write register circuits 33-1 and 33-2 are in conditions such that the both data are fully stared with the access data, i.e., status of the circuit is called as a full conditions and, then, when a read access signal is input, the operation processing is no longer carried out maintaining the order of accesses that was done in the prior art but, instead, the order of write access signals and read access signals is changed or the data is read out before the write data held in the wright register circuit 33-1 is stored in the shared memory means 5 in response to the second write access signal.

According to a first aspect of the fifth embodiment of the present invention, therefore, there is provided a data transfer system in which data-holding means 3A to 3C are provided between a plurality of the devices A to C and at least one shared memory means 5, the data-holding means corresponding to said devices, said devices and said data-holding means being connected together, and said data-holding means 3A to 3C and said shared memory means 5 being connected to a memory data bus 4, wherein when access is made from at least one of said plurality of devices A to C to write predetermined data into said shared memory means 5, when first and second write signals W1 and W2 are successively sent from one device 1A to the shared memory means 5 to read the predetermined data from the shared memory means 5, when a read signal R1 is output to the shared memory means 5 while the write signals W1 and W1 are being stored in the first and second write register circuits 33-1 and 33-2 in the data-holding means 3A, and when the address of the second write signal is not the same as the address of the read signal, then, the shared memory means 5 is allowed to execute the access by the read signal R1 prior to executing the access by the second write signal W2 stored in the first write register circuit in the data-holding means 3A.

According to a second aspect of the fifth embodiment of the present invention, furthermore, there is provided a data transfer apparatus of the same constitution as the above-mentioned one, wherein when first and second write signals W1 and W2 are successively output from one device A to the shared memory means 5, when a read signal R1 is output to the shared memory means 5 while the write signals W1 and W2 are being stored in the first and second write register circuits 33-1 and 33-2 in the data-holding means 3A, and when the address of the second write signal address is the same as the address of the read signal, the shared memory means 5 does not execute the access by the read signal R1 but, instead, the data of the second write signal W2 stored in the first write register circuit 33-1 is directly output as the read data to the device A.

That is, according to the first aspect of the fifth embodiment of the present invention as shown in FIG. 29, the first write access signal W1 and the second write access signal W2 are input in this order, the second write access signal W2 is stored in the first write register circuit 33-1 and the first write access signal W1 shifted from the first write register circuit 33-1 is stored in the second write register circuit 33-2. In this state, when a read access signal R1 is input and when the address of the second write access signal W2 is different from the address of the read access signal R1, the read access signal is output to the shared memory means 5 to read the predetermined data before the second write access signal W2 is stored in the shared memory means 5, and then the access by the second write access signal W2 is executed.

A signal DTACKX1 in FIG. 29 is output after the access by the read access signal is finished.

According to the second aspect of this embodiment as shown in FIG. 30, on the other hand, the first write access signal W1 and the second write access signal W2 are input in this order, the second write access signal W2 is stored in the first write register circuit 33-1, and the first write access signal W1 shifted from the first write register circuit 33-1 is stored in the second write register circuit 33-2. In this state, when a read access signal R1 is input and when the address of the second write access signal W2 is the same as the address of the read access signal R1, it is obvious that the data of predetermined address in the shared memory means 5 will be rewritten. Therefore, there arises a problem when the access by the read access signal is executed prior to the access by the second write access signal. Accordingly, access to the shared memory means 5 by the read access signal is not executed and, instead, the second write access data signal stored in the first write register circuit 33-1 is output as a read data signal.

The data transfer apparatus for realizing the first and second aspects of the fifth embodiment of the present invention has the constitution nearly the same as the basic constitution shown in FIG. 1 except the internal structure of the data-holding means 3A to 3C.

That is, as shown in FIG. 31, the data-holding means 3A in the data transfer apparatus comprises a first bidirectional data buffer circuit 31 connected to the data bus 2A, a second bidirectional data buffer circuit 32 connected to the memory data bus 4, a first write register circuit 33-1 which receives an output of the first bidirectional data buffer circuit 31, a second write register circuit 33-2 which receives an output of the first write register circuit 33-1 and sends an output to the second bidirectional data buffer circuit 32, a read register circuit 34 which receives an output from the second bidirectional data buffer circuit 32 and sends an output to the first bidirectional data buffer circuit 31, and a selector means 200 which is provided between the read register circuit 34 and the first bidirectional data buffer circuit 31 and of which the output is connected to the input of the first bidirectional data buffer circuit 31 and of which the input is connected to the first write register circuit 33 and to the read register circuit 34.

It is desired that the data transfer apparatus used in the fifth embodiment of the present invention is provided with a write/read judging means 300 which, when a write signal W1 is output at a first timing from a given device to the shared memory means 5, a second write signal W2 is output to the shared memory means 5 at a subsequent second timing, and the first and second write signals W1 and W2 are both stored at a third timing in the first and second write register circuits 33-1 and 33-2 in the data-holding means or when part of these first and second write signals are stored in the memory, judges whether the read signal R1 is output to the shared memory 5.

Figure 32:
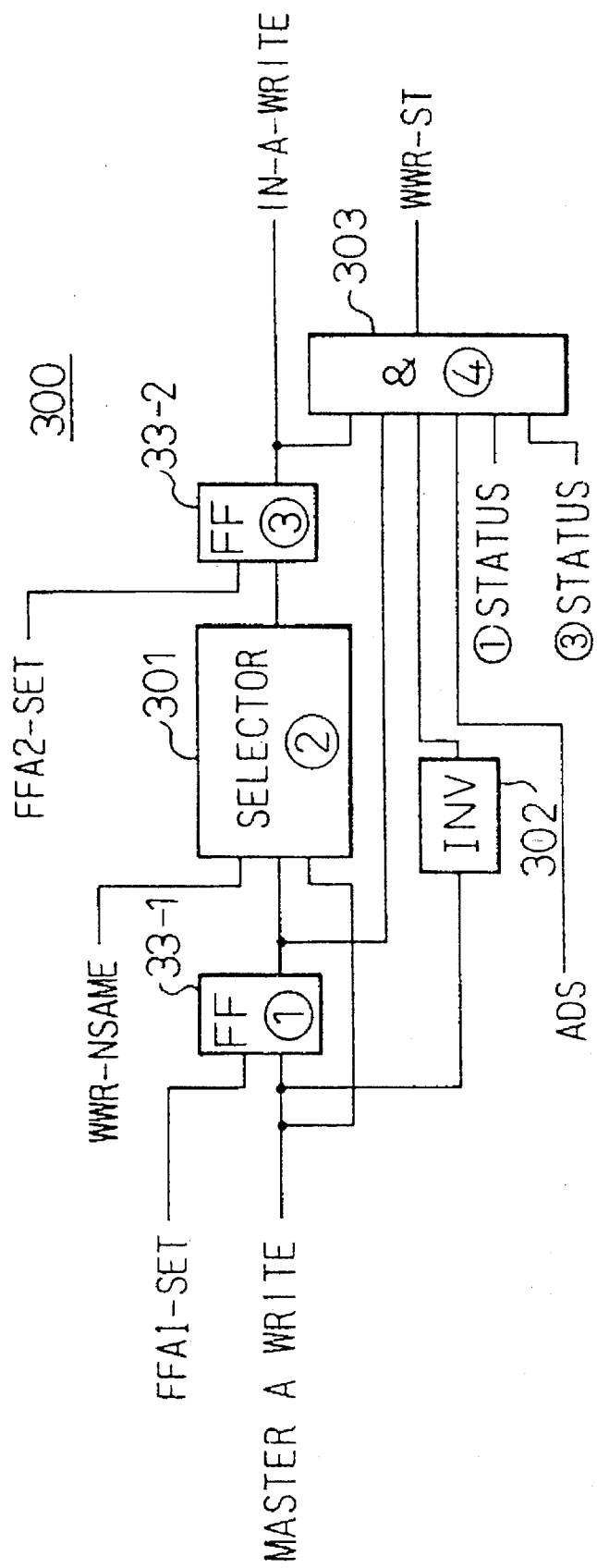
FIG. 32 is a block diagram illustrating the constitution of the write/read judging means used in the fifth embodiment of the present invention.

The basic constitution of the write/read judging means 300 is as shown in FIG. 32 and its operation is basically the same as that of the write/read judging means 203 shown in FIG. 27. Here, however, what makes a difference is that the write/read judging means 203 judges the input relationship between the write access signal W1 and the read access signal R1, whereas the write/read judging means 300 of this embodiment judges whether the first write address signal W1, the second write access signal W2 and the read access signal R1 are input in this order, i.e., in the order of W1, W2 and R1 or not.

Constitution and operation of the write/read judging means 203 will now be described. The write register circuits denoted by FF-1 and FF-2 in FIG. 32 correspond to the first write register circuit 33-1 and to the second write register circuit 33-2 in FIG. 31, and the write/read judging means 300 judges the arrival of the read access signal (indicated in a state where ADS and an inverted signal *Write of the Write signal in the drawing are asserted) in a state in which the write access signals are stored in the first and second write register circuit 33-1 and 33-2.

First, in FIG. 32, the first write register circuit (FF-1) 33-1 latches the write signal (Write) when its status (full or empty) is empty and when FFA1-SET is asserted in the first cycle in which ADS is asserted.

The selector means 301, on the other hand, outputs the write signal (Write) of the master when the output (WWR-ST) of the write/read judging means 300 has the level "H" and when the read address R1 is not equal to the second write address W2 (i.e., when the signal RWSAME mentioned below has the level "L"), and outputs the data of the second write access signal stored in the first write register circuit (FF-1) 33-1 when the read address R1 is equal to the second write address W2 (i.e., when the signal RWSAME mentioned below has the level "H").

The second write register circuit (FF-3) 33-2 latches the output of the selector circuit 301 when its status (full or empty) is empty and when the status of the first write register circuit (FF-1) 33-1 is full or when the output of the write/read judging means 300 has the level "H" and FFA2-SET is asserted in the first cycle.

The AND circuit 303 is asserted when the statuses of the first and second write register circuits (FF-1, FF-3) 33-1 and 33-2 are full, the outputs of the first and second write register circuits (FF-1, FF-3) 33-1 and 33-3 have the level "H" (i.e., Write), the ADS has the level "H" and the write signal (write) has the level "L" (i.e., when the read access signal is input). That is, the AND circuit 303 judges the write access signals W1, W2 and the read access signal 1 that are input in this order.

The selector means 301, on the other hand, outputs the write signal (Write) of the master when the output (WWR-ST) of the write/read judging means 300 has the level "H" and when the read address R1 is not equal to the second write address W2 (i.e., when the signal RWSAME mentioned below has the level "L"), and outputs the data of the second write access signal stored in the first write register circuit (FF-1) 33-1 when the read address R1 is equal to the second write address W2 (i.e., when the signal RWSAME mentioned below has the level "H").

The AND circuit 303 is asserted and outputs a WWR-ST signal when the statuses of the first write register circuit (FF-1) 33-1 and the second write register circuit (FF-3) 33-2 are full, the outputs of the first write register circuit (FF-1) 33-1 and the second write register circuit (FF-3) 33-2 have the level "H" (i.e., Write), the ADS has the level "H" and the write signal (Write) has the level "L" (in this case, the write access signal and the read access signal are expressed by the write access signals, and the write access signal having the level "L" stands for that the read access signal is input).

That is, the AND circuit 303 judges the first write access signals W1, the second write access signal W2 and the read access signal R1 that are input in this order.

Figure 33:
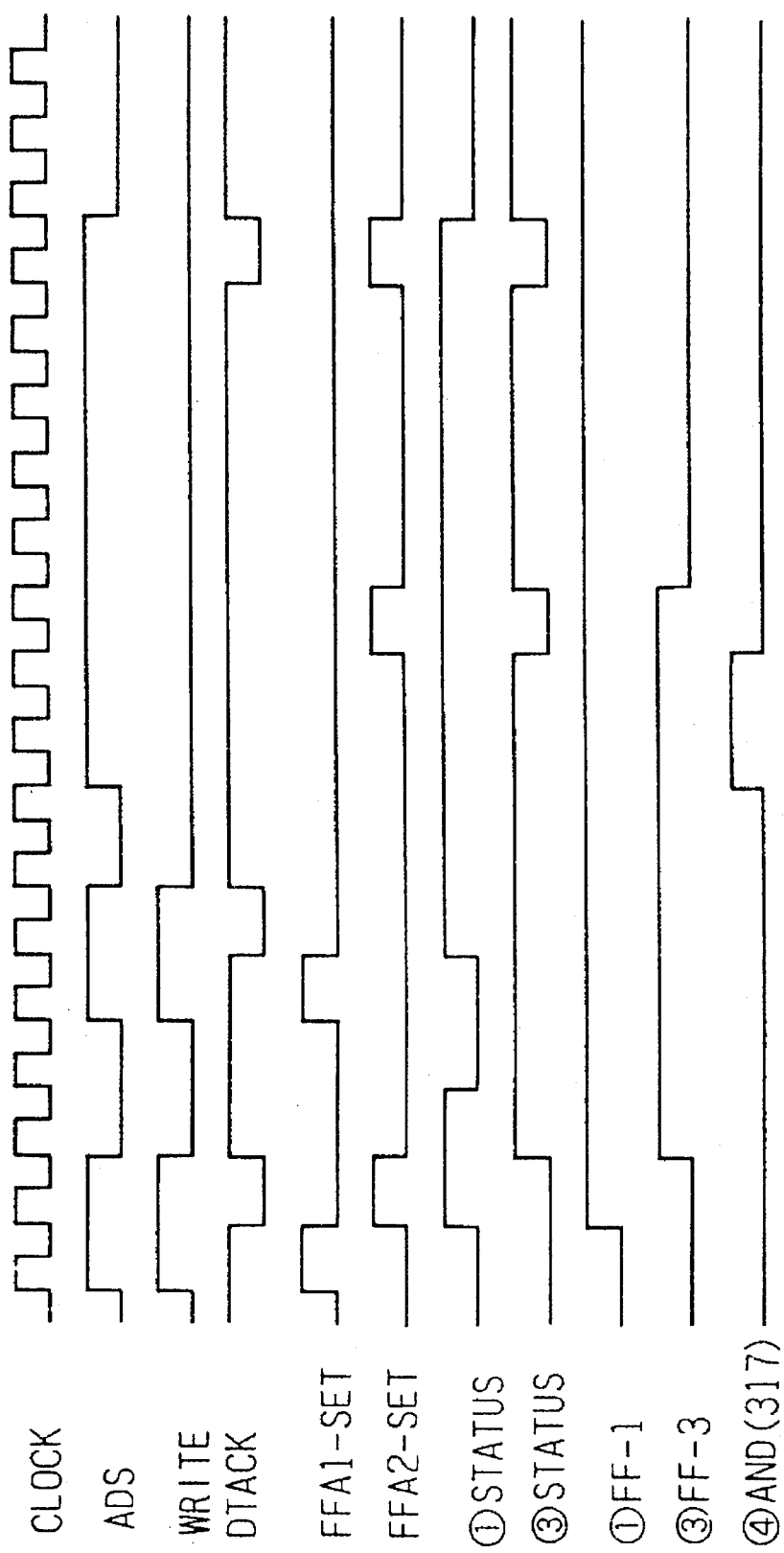
FIG. 33 is a timing chart showing operation waveforms of the circuits in the write/read judging means used in the fifth embodiment of the present invention.

FIG. 33 is a time chart illustrating the output waveforms in the circuits shown in FIG. 32.

Figure 34:
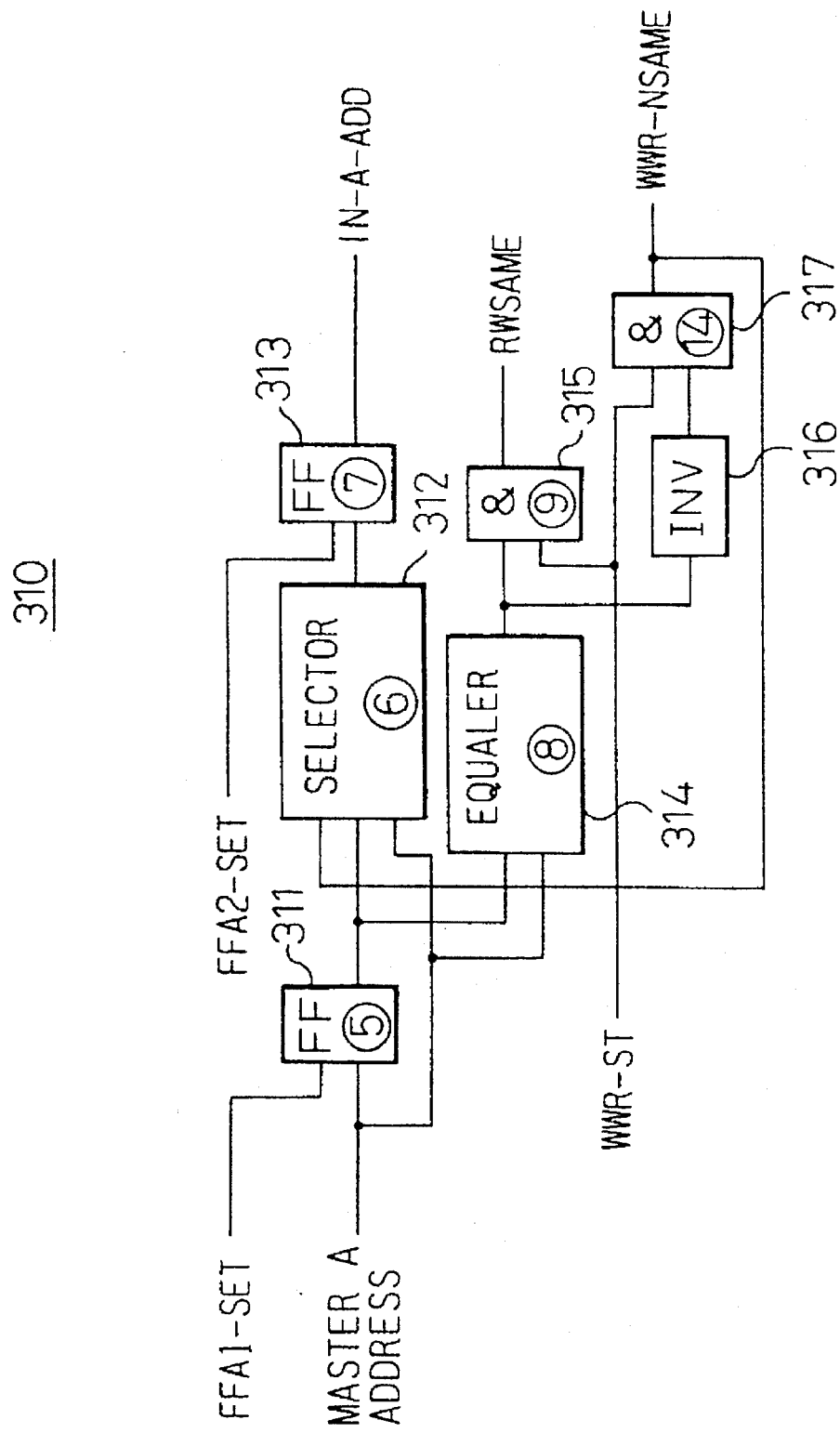
FIG. 34 is a block diagram illustrating the constitution of the address coincidence judging means used in the fifth embodiment of the present invention.
Figure 35:
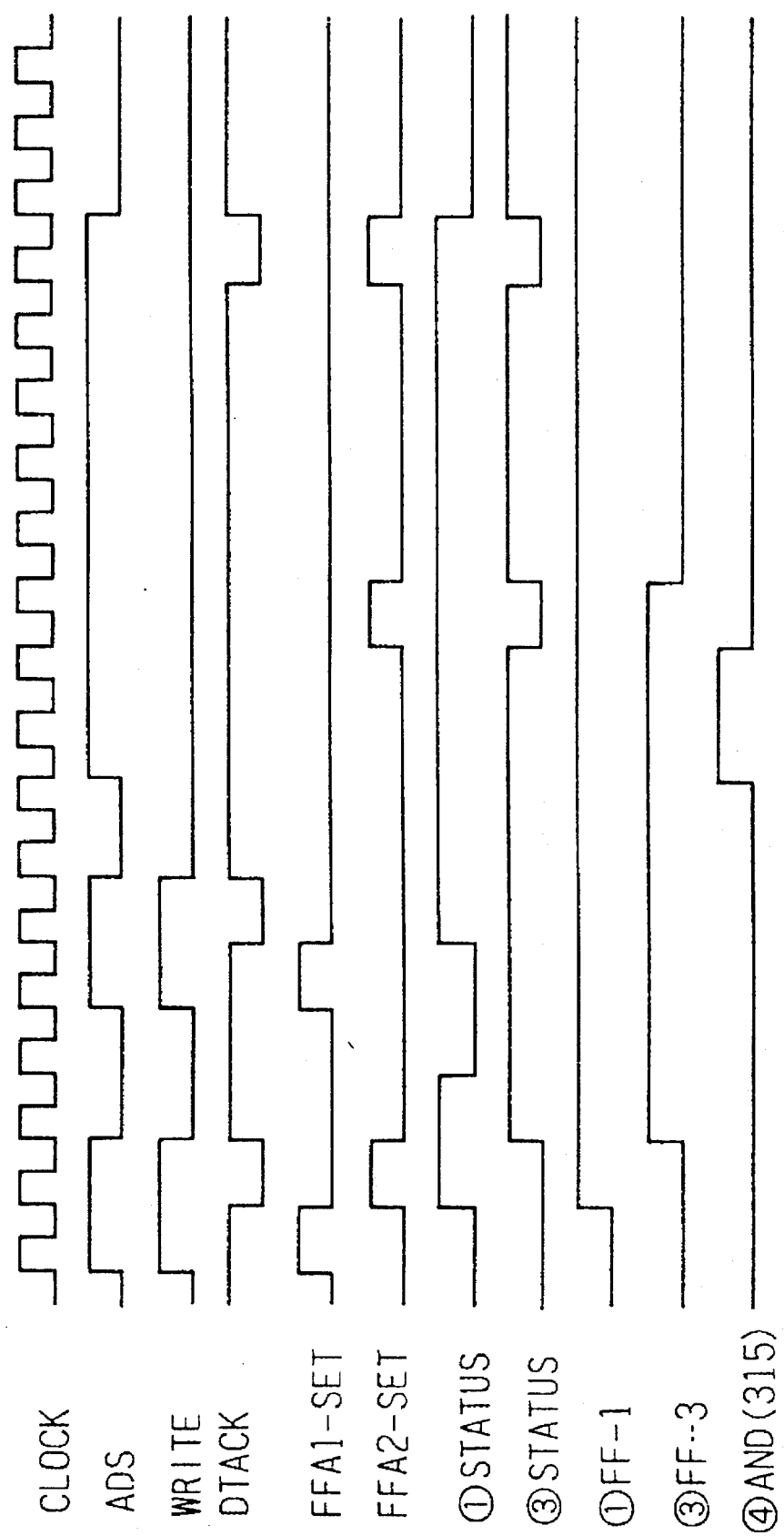
FIG. 35 is a timing chart showing the operation waveforms of the circuits in the address coincidence determining means used in the fifth embodiment of the present invention.

It is desired that the fifth embodiment of the present invention is provided with an address coincidence judging means 310 that is shown in FIG. 34. In response to the output signal from the write/read judging means 300, the address coincidence determining means 310 judges whether the address of the second write signal W2 output to the shared memory means 5 at the second timing coincides with the address of the read signal R1 output to the shared memory means 5 at the third timing.

The address coincidence judging means 310 is also called an address buffer, and its schematic constitution and operation are basically the same as those shown in FIG. 28.

That is, the address (Write) of the master A is latched by the first write register circuit (register circuit denoted by FF-5) when the signal FFA1-SET shown in FIG. 32 is asserted.

The selector circuit 312 outputs the address data of the register circuit 311 denoted by FF-5 when the output of the AND circuit 317 has the "L" level, i.e., when the two write access signals W1, W2 and read access signal R1 are input and when the address of the second write signal W2 is not the same as the address of the read signal R1, and selects and outputs the address of the master A when the above addresses are the same, i.e., when the output of the AND circuit 317 has the level "H".

Moreover, the register circuit 313 which is the second write register circuit (FF-7) latches the output of the selector circuit 312 when the signal FFA2-SET shown in FIG. 32 is asserted.

An equalar 314 assumes the level "H" when the address of the master A and the address of the first register circuit 311 denoted by FF-5 are equal to each other. When the two write address signals W1, W2 and the read address signal R1 are input, an AND circuit 315 obtains AND of the output of the equalar 314 and status signal WWR-ST of FIG. 32, and outputs a signal of the level "H" as a signal RWSAME indicating that the addresses of the second write signal W2 and the read signal R1 are the same. Further, an AND circuit 317 obtains an AND of the status signal WWRST and a signal which is inverted from the output of the equalar 314 through an inverter (INV) 316, and outputs a signal WWR-NSAME of the "L" level indicating that the second write address signal W2 and the read address signal R1 have different addresses when the two write access signals W1, W2 and the read access signal R1 are input.

In FIG. 31, therefore, the WWRSAME signal usually has the level "L" indicating that the two signals have different addresses, and the selector means 200 outputs the value of the read register circuit 34 as a read value to the bidirectional data buffer circuit 31. The WRSAME signal having the level "H" indicates the two signals have the same address, and the selector means 200 is switched to output the value of address of the first register circuit 33-1 denoted by FF-5 as a read value.

That is, when the output of the address coincidence judging means indicates that the write signal address and the read signal address are not the same, the selector means in the data transfer apparatus of the present invention works to output the signal data stored in the reading register to the first bidirectional data buffer circuit. When the output of the address coincidence judging means indicates that the write signal address and the read signal address are the same, the selector means works to output the write signal data stored in the write register circuit to the first bidirectional data buffer circuit.

It is desired that the data transfer apparatus used in the fifth embodiment of the present invention is provided with an address coincidence judging means which, in response to the output signal of the write/read judging means, judges whether the address of the second write signal output to the shared memory means at the second timing is the same as the address of the read signal output to the shared memory means at the third timing.

In the data transfer apparatus of this embodiment, furthermore, it is desired that the selector means is controlled by the output of the address coincidence judging means.

When the output of the address coincidence judging means indicates that the second write signal address is not the same as the read signal address, the selector means of this embodiment works to output the read signal data stored in the read register to the first bidirectional data buffer circuit. When the output of the address coincidence judging means indicates that the second write signal address is the same as the read signal address, the selector means works to output the second write signal data stored in the first write register circuit to the first bidirectional data buffer circuit.

Described below are the data transfer system and the data transfer apparatus according to a sixth embodiment of the present invention.

According to the aforementioned fourth an fifth embodiments, provision was made of a plurality of write register circuits and a selector means for switching the position of the data that is to be read by the read access signal in order to increase the speed of operation when a plurality of address signals are successively input while preventing the occurrence of time-out. According to the sixth embodiment, however, the object of the present invention is accomplished without using the selector means.

That is, the sixth embodiment of the present invention uses the data-holding means 3A to 3C that are shown in FIG. 22 and its constitution is concerned with a data transfer system in which data-holding means 3A to 3C are provided between a plurality of the devices A to C and at least one shared memory means 5, the data-holding means 3A to 3C corresponding to said devices A to C, said devices and said data-holding means 3A to 3C being connected together, and said data-holding means 3A to 3C and said shared memory means 5 being connected to a memory data bus 4, wherein when access is made from at least one of said plurality of devices to write predetermined data into said shared memory means 5, when first and second write signals W1 and W2 are successively sent from one device A to the shared memory means 5 to read the predetermined data from the shared memory means 5, when a read signal R1 is output to the shared memory means 5 while the write signals W1 and W1 are being stored in the first and second write register circuits 33-1 and 33-2 in the data-holding means 3A, and when the address of the second write signal W2 is the same as the address of the read signal R1, the reading operation is carried out in response to said read signal R1 prior to writing the second write signal W2 into the shared memory means 5 and the predetermined data in the shared memory means 5 is stored in the read register circuit 34 provided in the data-holding means 3A and, then, the data of the second write signal W2 is written into the shared memory means 5.

That is, in this embodiment, when it is attempted to access to a plurality words or to write burst access or only a part of a word by making access to a memory, the first and second two write signals W1 and W2 are successively output to the shared memory means 5. Then, when a read signal R1 is output to the shared memory means 5 while the write signals W1 and W2 are being stored in the first and second write register circuits 33-1 and 33-2 in the data-holding means 3A, the read-modified write operation is executed while the second write access signal is being output to output the value of the write buffer as a read value and, at the same time, the access by the second write access signal W2 is executed.

Figure 36:
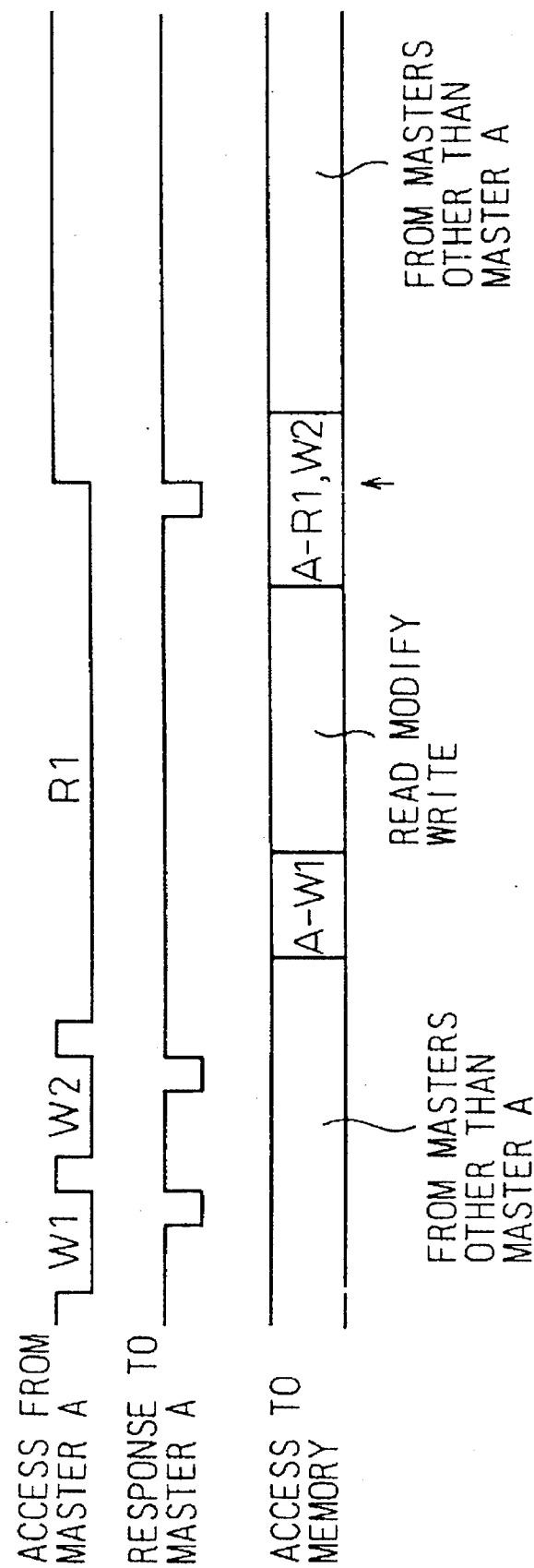
FIG. 36 is a timing chart illustrating the processings of write access signals and read access signals according to a sixth embodiment of the present invention.

FIG. 36 is a timing chart illustrating access signals and operations according to the sixth embodiment of the present invention.

The data transfer apparatus for executing the above data transfer system of the present invention has the basic constitution of the data transfer apparatus shown in FIG. 1, wherein the data-holding means used in the data transfer apparatus comprises a first bidirectional data buffer circuit 31 connected to the data bus 2, a second bidirectional data buffer circuit 32 connected to the memory data bus 4, a first write register circuit 33-1 which receives an output of the first bidirectional data buffer circuit 31, a second write register circuit 33-2 which receives an output of the first write register circuit 33-1 and sends an output to the second bidirectional data buffer circuit 32, a read register circuit 34 which receives an output from the second bidirectional data buffer circuit 32 and sends an output to the first bidirectional data buffer circuit 31, a write/read judging means 300 which, when a write signal W1 is output at a first timing from a given device to the shared memory means 5, when a second write signal W2 is output to the shared memory means 5 at a subsequent second timing, and when these first and second write signals W1 and W2 are both stored at a third timing in the first and second write register circuits 33-1 and 33-2 in the data-holding means or when part of these first and second write signals W1 and W2 are stored in the memory, judges whether the read signal is output to the shared memory 5, an address coincidence judging means 10 which judges whether the address of the second write signal S2 output to the shared memory means 5 at the second timing in response to a signal output from the write/read judging means 300 is the same as the address of the read signal R1 output to the shared memory means 5, and a read-modified write means 400 which causes the data-holding means 3A to execute the read-modified write operation in response to an output of the address coincidence judging means 310.

According to the data transfer system and the data transfer apparatus of the present invention, it is possible to easily transfer the data among a plurality of the masters at high speed without using a complex circuit constitution.

According to the data transfer apparatus and the data transfer system of the present invention having the above-mentioned constitution, furthermore, it is allowed to prevent the occurrence of time-out even when a plurality of access signals are successively output, and the operation processing for the access is executed at a high speed.

We claim:

1. A data transfer apparatus comprising:
   data devices which produce control information;
   data buffers respectively corresponding to the data devices, each data buffer having an input terminal and an output terminal, each data device connected to the input terminal of the corresponding data buffer for transferring data between the respective data device and the corresponding data buffer;
   a shared memory;
   a memory bus connected to the output terminal of each of the data buffers and to the shared memory to allow data to be transferred between the data buffers and between the data devices and the shared memory via the data buffers, data being transferrable between data devices by transferring data from a respective data device defined as a transferring data device to a different data device defined as a receiving data device by connecting the output terminal of the data buffer corresponding to the transferring data device to the output terminal of the data buffer corresponding to the receiving data device via the memory bus to form a data transfer path between the data buffer corresponding to the transferring data device and the data buffer corresponding to the receiving data device, where data is then transferred from the transferring data device to the data buffer corresponding to the transferring data device, from the data buffer corresponding to the transferring data device to the data buffer corresponding to the receiving data device via the data transfer path, and then from the data buffer corresponding to the receiving data device to the receiving data device; and a data transfer controller which receives the control information produced by the data devices and, in accordance with the control information, forms the data transfer path and controls the data buffers and the shared memory so that the shared memory does not transfer data onto the memory bus when, during the transfer of data between the transferring data device and the receiving data device, data is being transferred in the data transfer path, wherein each data buffer includes a first bidirectional data buffer connected to the corresponding data device and producing a controllable output signal, a second bidirectional data buffer connected to the memory bus and producing a controllable output signal, a write register which receives the output signal produced by the first bidirectional data buffer and produces a corresponding write register output signal which is provided to the second bidirectional data buffer, and a read register which receives the output signal produced by the second bidirectional data buffer and produces a corresponding read register output signal which is provided to the first bidirectional data buffer.

2. A data transfer apparatus according to claim 1, wherein at least one data device produces an access request signal to access a different data device via the memory bus, and the data transfer controller comprises:

a through transfer mode register for determining the data transfer path in response to the control information produced by the at least one data devices producing an access request signal, and producing a corresponding output signal;

an arbitration means, receiving the access request signal from each of the at least one data devices, for giving the right to access the memory bus to a respective data device of the at least one data devices producing an access request signal in accordance with a priority order, and producing a corresponding output signal;

a through judging means, receiving the output signal produced by the through transfer mode register, the output signal produced by the arbitration means and the control information produced by the data device given the right to access, for judging when data is transferrable through the data transfer path and producing a corresponding output signal; and a data holding control means, receiving the output signal by the through judging means, the control information produced by the respective data device given the right to access and the output signal produced by the arbitration means, for producing control signals to control the first and second bidirectional data buffers and the write and read registers in the data buffers.

3. A data transfer apparatus according to claim 2, wherein the arbitration means arbitrates the access request signals to allow data to be transferred from a respective data device to a different data device.

4. A data transfer apparatus according to claim 2, wherein, when the right to access the memory bus is given to a respective data device in response to a request to access the memory bus for writing data to a different data device, the data buffer of the respective data device given the right to access the memory bus causes a storage control signal to be produced for controlling the read register of the data buffer of the data device to which data is to be written.

5. A data transfer apparatus according to claim 2, wherein the requests to access the memory bus include requests to access the memory bus for reading data from a respective data bus to a different data bus, and the arbitration means arbitrates the requests to access the memory bus for reading data from a respective data device to a different data device.

6. A data transfer apparatus according to claim 2, wherein:

the requests to access the memory bus include a request to access the memory bus by a respective data device to read data from a different data device, and when the right to access the memory bus is given to the data device producing the request to access the memory bus to read data from a different data device, the data device producing the request to access causes an output control signal to be produced to control the data buffer corresponding to the data device from which data is to be read.

7. A data transfer apparatus according to claim 1, wherein:

in each data buffer, the output signal received by the write register indicates a data address for writing data and the output signal received by the read register indicates a data address for reading data, when a request to access is made from at least one data device to write data into the shared memory while a request to access is made from a data device to read data from the shared memory, access to the shared memory is allowed for one of the at least one data devices requesting access to write data, and when a request to access is made to read data from the shared memory while an output signal is being received by the write register of a respective data buffer and the address indicated by the output signal received by the write register and the address indicated by an output signal received by a read register of a respective data buffer are not the same, the shared memory allows access to the shared memory for the data device requesting access to the shared memory prior to allowing access to the shared memory for the output signal received the write register circuit.

8. A data transfer apparatus according to claim 1, wherein:

in each data buffer, the output signal received by the write register indicates a data address for writing data and the output signal received by the read register indicates a data address for reading data, when a request to access is made from at least one data device to write data into the shared memory while a request to access is made for a data device to read data from the shared memory, access to the shared memory is allowed for one of the at least one data devices requesting access to write data, and when a request to access is made to read data from the shared memory while an output signal is being received by the write register of a respective data a buffer and the address indicated by the output signal received by the write register and the address indicated by the output signal received by a read register of a respective data buffer are the same, the shared memory does not allow access for the output signal received by the read register but, instead, the data corresponding to the output signal received by the write register is directly output as read data to the data device requesting access to read data.

9. A data transfer apparatus according to claim 1, further comprising:

a selector means between the read register and the first bidirectional data buffer, the selector producing an output which is received by the first bidirectional data buffer and receiving the write register output signal from the write register and the read register output signal from the read register as inputs.

10. A data transfer apparatus according to claim 9, further comprising:

a write/read judging means for, when a respective data device requests access to the shared memory to write to the shared memory at a first timing and when the request to access is stored at a second timing in the write register of the corresponding data buffer, judging whether a signal to read data from the shared memory is to be output to the shared memory, and for producing a corresponding output signal.

11. A data transfer apparatus according to claim 10, further comprising:

an address coincidence judging means for, in response to the output signal produced by the write/read judging means, judging whether the address of the request to access at said first timing is the same as the address of the signal to read data from the shared memory, and for producing a corresponding output signal.

12. A data transfer apparatus according to claim 11, wherein the selector is controlled by the output signal produced by the address coincidence judging means.

13. A data transfer apparatus according to claim 12, wherein:

when the output signal produced by the address coincidence judging means indicates that the address of an access request to write to the shared memory is not the same as the address of an access request to read to the shared memory, the selector outputs data stored in the read register to the first bidirectional data buffer, and when the output of signal produced by the address coincidence judging means indicates that the address of an access request to write to the shared memory is the same as the address of an access request to read to the shared memory, the selector outputs data stored in the write register circuit to the bidirectional data buffer.

14. A data transfer apparatus according to claim 1, wherein:

each data buffer comprises first and second write registers, when a request to access is made from a data device to write data into the shared memory first and second write signals are successively output from the data device to the shared memory to read data from the shared memory, the first and second write signals being stored in the first and second write registers of the data buffer corresponding to the data device making the request to access.

when a request to access the shared memory is made to read from the shared memory while the first and second write signals are being stored in the first and second write registers, and the address corresponding to the second write signal is not the same as the address corresponding to request to access the shared memory to read from the shared memory, then the shared memory allows access to the shared memory as a result of the request to access to read from the shared memory prior to allowing access to the shared memory as a result to the second write signal stored in the write register.

15. A data transfer apparatus according to claim 1, wherein:

each data buffer comprises first and second write registers, when a request to access is made from a data device to write data into the shared memory, first and second write signals are successively output from the data device to the shared memory to read data from the shared memory, the first and second write signals being stored in the first and second write registers of the data buffer corresponding to the data device making the request to access, when a request to access the shared memory is made to read from the shared memory while the first and second write signals are being stored in the first and second write registers, and the address corresponding to the second write signal is the same as the address corresponding to the request to access the shared memory to read from the shared memory, the shared memory does not allow access to the shared memory as a result of the request to access to read from the shared memory but, instead, the data of the second write signal stored in the write register is directly output as data to be read.

16. A data transfer apparatus comprising:

data devices which produce control information;

data buffers respectively corresponding to the data devices, each data buffer having an input terminal and an output terminal, each data device connected to the input terminal of the corresponding data buffer for transferring data between the respective data device and the corresponding data buffer;

a shared memory;

a memory bus connected to the output terminal of each of the data buffers and to the shared memory to allow data to be transferred between the data buffers and between the data devices and the shared memory via the data buffers, data being transferrable between data devices by transferring data from a respective data device defined as a transferring data device to a different data device defined as a receiving data device by connecting the output terminal of the data buffer corresponding to the transferring data device to the output terminal of the data buffer corresponding to the receiving data device via the memory bus to form a data transfer path between the data buffer corresponding to the transferring data device and the data buffer corresponding to the receiving data device, where data is then transferred from the transferring data device to the data buffer corresponding to the transferring data device, from the data buffer corresponding to the transferring data device to the data buffer corresponding to the receiving data device via the data transfer path, and then from the data buffer corresponding to the receiving data device to the receiving data device; and a data transfer controller which receives the control information produced by the data devices and, in accordance with the control information, forms the data transfer path and controls the data buffers and the shared memory so that the shared memory does not transfer data onto the memory bus when, during the transfer of data between the transferring data device and the receiving data device, data is being transferred in the data transfer path, wherein each data buffer includes a first bidirectional data buffer connected to the corresponding data device and producing a corresponding output signal, a second bidirectional data buffer connected to the memory bus and producing a corresponding output signal, a first write register which receives the output signal produced by the first bidirectional data buffer and produces a corresponding first write register output signal, a second write register which receives the first write register output signal and produces a corresponding second write register output signal which is provided to the second bidirectional data buffer, a read register which receives the output signal produced by the second bidirectional data buffer and produces a corresponding read register output signal which is provided to the first bidirectional data buffer, and a selector between the read register and the first bidirectional data buffer, the selector producing a corresponding output signal which is provided to the first bidirectional data buffer and receiving the read register output signal circuit and one of the first write register output signal and the second write register output signal as inputs.

17. A data transfer apparatus according to claim 16, further comprising:

a write/read judging means for, when a respective data device makes a first request to access the shared memory to write to the shared memory at a first timing, a second request to access the shared memory to write to the shared memory is made at a subsequent second timing, and the first and second request to access are both stored at a third timing, judging whether a request to access the shared memory to read from the shared memory has been made and for producing a corresponding output signal.

18. A data transfer apparatus according to claim 17, further comprising:

an address coincidence judging means for, in response to the output signal produced by the write/read judging means, judging whether the address of the second request to access is the same as the address of the request to access the shared memory to read from the shared memory, and for producing a corresponding output signal.

19. A data transfer apparatus according to claim 18, wherein the selector is controlled by the output signal produced by the address coincidence judging means.

20. A data transfer apparatus according to claim 19, wherein the selector causes data stored in the read register to be output to the first bidirectional data buffer circuit when the output signal of the address coincidence judging means indicates that the address of the second request to access and the address of the request to access the shared memory to read from the shared memory are not the same, and causes data stored in the write register producing the said one of the first write register output signal and the second write register output signal received as an input by the selector to the first bidirectional data buffer when the output signal produced by the address coincidence judging means indicates that the address of the second request to access and the address of the request to access the shared memory to read from the shared memory are the same.

21. A data transfer apparatus as in claim 1, wherein:

when a request to access is made from a data devices to write data into the shared memory, when first and second write signals are successively sent from the data device to the shared memory to read data from the shared memory, the first and second write signals being stored in the first and second write registers of the data buffer corresponding to the data device making the request to access, when a request to access the shared memory is made to read from the shared memory while the first and second write signals are being stored in the first and second write registers, and the address corresponding to the second write signal is the same as the address corresponding to the request to access the shared memory to read from the shared memory, the shared memory allows access to the shared memory as a result of the request to access to read from the shared memory prior to allowing access to the shared memory as a result of the second write signal and data in the shared memory is stored in the read register of the data buffer and, then, data of the second write signal is written into the shared memory.

22. A data transfer apparatus comprising:

data devices which produce control information;

data buffers respectively corresponding to the data devices, each data buffer having an input terminal and an output terminal, each data device connected to the input terminal of the corresponding data buffer for transferring data between the respective data device and the corresponding data buffer;

a shared memory;

a memory bus connected to the output terminal of each of the data buffers and to the shared memory to allow data to be transferred between the data buffers and between the data devices and the shared memory via the data buffers, data being transferrable between data devices by transferring data from a respective data device defined as a transferring data device to a different data device defined as a receiving data device by connecting the output terminal of the data buffer corresponding to the transferring data device to the output terminal of the data buffer corresponding to the receiving data device via the memory bus to form a data transfer path between the data buffer corresponding to the transferring data device and the data buffer corresponding to the receiving data device, where data is then transferred from the transferring data device to the data buffer corresponding to the transferring data device, from the data buffer corresponding to the transferring data device to the data buffer corresponding to the receiving data device via the data transfer path, and then from the data buffer corresponding to the receiving data device to the receiving data device; and a data transfer controller which receives the control information produced by the data devices and, in accordance with the control information, forms the data transfer path and controls the data buffers and the shared memory so that the shared memory does not transfer data onto the memory bus when, during the transfer of data between the transferring data device and the receiving data device, data is being transferred in the data transfer path, wherein each data buffer includes a first bidirectional data buffer circuit connected to the corresponding data device and producing a corresponding output signal, a second bidirectional data buffer connected to the memory bus and producing a corresponding output signal, a first write register which receives the output signal produced by the first bidirectional data buffer and produces a corresponding first write register output signal, a second write register which receives the first write register output signal and produces a corresponding second write register output signal which is provided to the second bidirectional data buffer, and a read register which receives the output signal produced by the second bidirectional data buffer and produces a corresponding read register output signal which is provided to the first bidirectional data buffer, the data transfer apparatus further including a write/read judging means for, when a respective data device makes a first request to access the shared memory to write to the shared memory at a first timing, a second request to access the shared memory to write to the shared memory is made at a subsequent second timing, and the first and second request to access are both stored at a third timing in the first and second write registers in the corresponding data buffer, judging whether a request to access the shared memory to read from the shared memory has been made, and for producing a corresponding output signal, an address coincidence judging means for judging whether the address of the second request to access is the same as the address of the request to access the shared memory to read from the shared memory, and for producing a corresponding output signal, and a read-modified write means which causes the data buffer to execute a read-modified write operation in response to an output signal produced by the address coincidence judging means.

* * * * *